United States Patent
Ozaki et al.

(10) Patent No.: US 12,247,490 B2
(45) Date of Patent: Mar. 11, 2025

(54) SHAFT SEALING DEVICE AND ROTARY MACHINE

(71) Applicant: MITSUBISHI HEAVY INDUSTRIES, LTD., Tokyo (JP)

(72) Inventors: Kohei Ozaki, Tokyo (JP); Masaya Kawano, Tokyo (JP); Azumi Yoshida, Tokyo (JP); Shintaro Okumura, Tokyo (JP); Tatsuro Furusho, Tokyo (JP); Shin Nishimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/681,261

(22) PCT Filed: Feb. 27, 2023

(86) PCT No.: PCT/JP2023/007015
§ 371 (c)(1),
(2) Date: Feb. 5, 2024

(87) PCT Pub. No.: WO2023/167133
PCT Pub. Date: Sep. 7, 2023

(65) Prior Publication Data
US 2024/0344463 A1 Oct. 17, 2024

(30) Foreign Application Priority Data
Mar. 4, 2022 (JP) .................................. 2022-033346

(51) Int. Cl.
*F01D 11/00* (2006.01)
*F01D 5/02* (2006.01)
(Continued)

(52) U.S. Cl.
CPC ............ *F01D 11/003* (2013.01); *F01D 5/025* (2013.01); *F01D 11/006* (2013.01); *F01D 11/02* (2013.01);
(Continued)

(58) Field of Classification Search
CPC combination set(s) only.
See application file for complete search history.

(56) References Cited

U.S. PATENT DOCUMENTS 6,343,792 B1 * 2/2002 Shinohara ............ F16J 15/3292
277/355
6,808,179 B1 * 10/2004 Bhattacharyya ..... F16J 15/3288
415/174.3
(Continued)

FOREIGN PATENT DOCUMENTS

| JP | 2002-013647 A | 1/2002 |
| WO | 2012/090793 A1 | 7/2012 |
| WO | 2015/056343 A1 | 4/2015 |

OTHER PUBLICATIONS

International Search Report dated May 16, 2023, issued in counterpart Application No. PCT/JP2023/007015. (4 pages).
(Continued)

*Primary Examiner* — Binh Q Tran
(74) *Attorney, Agent, or Firm* — WHDA, LLP

(57) ABSTRACT

This shaft sealing device comprises: a housing that has a storage groove; a seal body stored in the storage groove; and a projected part that projects from one of the housing and the seal body toward the other in the storage groove in an axial direction. The seal body divides an annular space into a high-pressure region on a first side in the axial direction and a low-pressure region on a second side in the axial direction. The housing has a connection part that connects the low-pressure region with the inside of the storage groove. The projected part divides a portion between an opposite surface
(Continued)

and a low-pressure-side lateral surface of the seal body into a first space on the radially outer side and a second space on the radially inner side. The connection part connects the first space with the low-pressure region.

12 Claims, 11 Drawing Sheets

(51) Int. Cl.
  *F01D 11/02* (2006.01)
  *F01D 25/18* (2006.01)
  *F16J 15/3268* (2016.01)
  *F16J 15/3272* (2016.01)
  *F16J 15/50* (2006.01)
  *F16J 15/52* (2006.01)
  *F16J 15/54* (2006.01)

(52) U.S. Cl.
  CPC ........ *F01D 25/183* (2013.01); *F05D 2240/55* (2013.01); *F05D 2240/581* (2013.01); *F05D 2240/59* (2013.01); *F16J 15/3268* (2013.01); *F16J 15/3272* (2013.01); *F16J 15/50* (2013.01); *F16J 15/52* (2013.01); *F16J 15/54* (2013.01)

(56) References Cited

U.S. PATENT DOCUMENTS

| | | | |
|---|---|---|---|
| 10,519,791 B2 * | 12/2019 | Yoshida | F01D 11/001 |
| 11,326,427 B2 * | 5/2022 | Artinian | E21B 43/128 |
| 2002/0105146 A1 | 8/2002 | Uehara et al. | |
| 2004/0256810 A1 * | 12/2004 | Nakano | F16J 15/3292 |
| | | | 277/402 |
| 2006/0208427 A1 | 9/2006 | Wright et al. | |
| 2013/0234397 A1 * | 9/2013 | Uehara | F16J 15/442 |
| | | | 277/353 |
| 2013/0259680 A1 | 10/2013 | Shinohara et al. | |
| 2015/0354707 A1 * | 12/2015 | Inoue | F02C 7/28 |
| | | | 277/355 |
| 2016/0258536 A1 | 9/2016 | Nishimoto et al. | |
| 2019/0162120 A1 * | 5/2019 | Yoshida | F16J 15/3252 |

OTHER PUBLICATIONS

Written Opinion dated May 16, 2023, issued in counterpart Application No. PCT/JP2023/007015, with English Translation. (7 pages).

* cited by examiner

SHAFT SEALING DEVICE AND ROTARY MACHINE

TECHNICAL FIELD

The present disclosure relates to a shaft sealing device and a rotary machine.

This application claims priority to Japanese Patent Application No. 2022-033346, filed in Japan on Mar. 4, 2022, the content of which is incorporated herein by reference.

BACKGROUND ART

A shaft sealing device is disposed around a rotary shaft of a rotary machine such as a gas turbine or a steam turbine to reduce a leakage amount of a working fluid flowing from a high-pressure side to a low-pressure side. The shaft sealing device seals an annular space between the rotary shaft and a stator that covers an outer peripheral side of the rotary shaft so as to partition a low-pressure region side and a high-pressure region side in an axial direction in which the rotary shaft extends.

For example, PTL 1 discloses a shaft sealing device including a housing in which an annular concave portion is formed to extend in a circumferential direction about the rotary shaft, and a sealing body which is disposed at an outer circumference of the rotary shaft and which has a part of the rotary shaft on an outer side in a radial direction accommodated by the annular concave portion of the housing. In the sealing body, a large number of sealing pieces are laminated in the circumferential direction with thickness directions of the sealing pieces facing the circumferential direction of the rotary shaft. The shaft sealing device includes a holding ring having a cross section with a groove shape and holding the sealing body in the annular concave portion of the housing, a high-pressure side sealing plate which is disposed along a high-pressure region side of the sealing body, and a low-pressure-side sealing plate which is disposed along a low-pressure region side of the sealing body.

CITATION LIST

Patent Literature

[PTL 1] International Publication No. 2015/056343

SUMMARY OF INVENTION

Technical Problem

However, in the configuration described in PTL 1, a plurality of components such as a holding ring and a low-pressure side seal are required in addition to the housing and the sealing body. Attempts to reduce these components in order to reduce costs may impair the sealing performance of the shaft sealing device. For example, if the low-pressure side seal or the holding ring is omitted, a working fluid, which has entered the annular concave portion of the housing from the high-pressure region side, flows into a gap between the housing and the low-pressure region side of the sealing body from the outer side to the inner side in the radial direction. As a result, excessive friction may be generated against an outer peripheral surface of the rotary shaft between a tip portion that is on a radial inner side of the sealing body and the outer peripheral surface of the rotary shaft, thereby leading to wear of the sealing body.

The present disclosure provides a shaft sealing device and a rotary machine capable of reducing costs while suppressing wear of a sealing body.

Solution to Problem

According to the present disclosure, a shaft sealing device includes: a housing which is disposed on an outer side in a radial direction at an interval with respect to a rotor being rotatable around a central axis, extends in a circumferential direction about the central axis, and has an accommodating groove that is recessed to the outer side in the radial direction; a sealing body which has a plurality of thin plates laminated in the circumferential direction, in which an outer peripheral end portion on the outer side in the radial direction is accommodated in the accommodating groove, and in which an inner peripheral end portion on an inner side in the radial direction extends from the housing to the inner side in the radial direction to come into slidable contact with an outer peripheral surface of the rotor; and a convex portion which protrudes in an axial direction in which the central axis extends from any one of the housing and the sealing body toward the other in the accommodating groove, in which the sealing body partitions an annular space between the rotor and the housing into a high-pressure region on a first side in the axial direction and a low-pressure region on a second side in the axial direction, the sealing body has a sealing body low-pressure-side side surface facing the second side in the axial direction within the accommodating groove, the housing has a facing surface which forms a part of the accommodating groove and faces the sealing body low-pressure-side side surface at an interval in the axial direction, and a communication portion which allows the low-pressure region and an inside of the accommodating groove to communicate with each other, the convex portion is formed on the facing surface or the sealing body low-pressure-side side surface, and partitions a space between the facing surface and the sealing body low-pressure-side side surface into a first space portion on the outer side in the radial direction and a second space portion on the inner side in the radial direction, and the communication portion allows the first space portion and the low-pressure region to communicate with each other.

According to the present disclosure, a rotary machine includes the shaft sealing device described above.

Advantageous Effects of Invention

According to the shaft sealing device and the rotary machine of the present disclosure, it is possible to reduce costs while suppressing wear of the sealing body.

DESCRIPTION OF EMBODIMENTS

First Embodiment

Hereinafter, embodiments of a shaft sealing device and a rotary machine according to the present disclosure will be described with reference to the accompanying drawings. However, the present disclosure is not limited to these embodiments only.
(Configuration of Rotary Machine)

Figure 1:
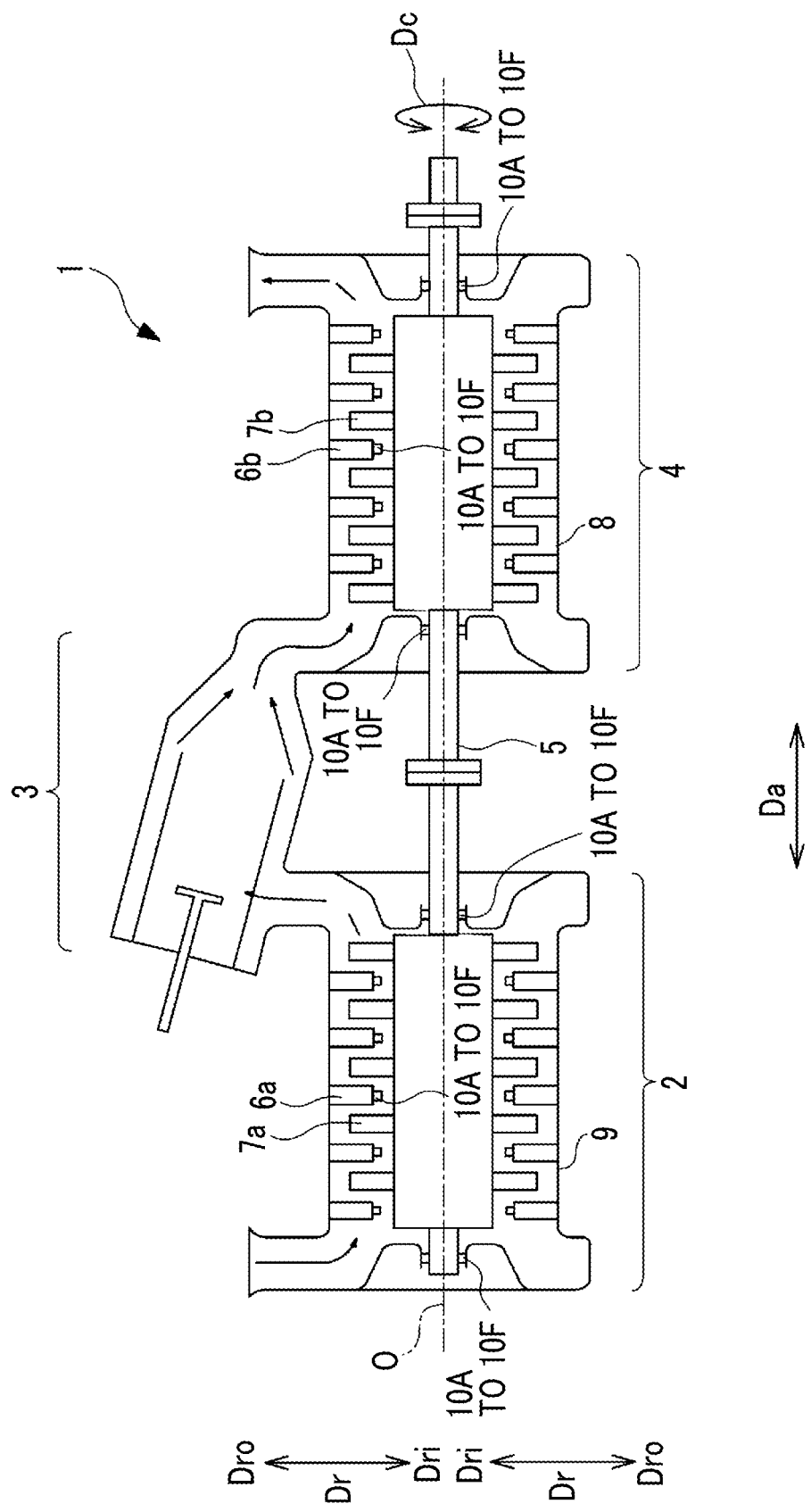
FIG. 1 is a schematic configuration view of a rotary machine according to an embodiment of the present disclosure.

As illustrated in FIG. 1, a rotary machine 1 according to the present embodiment is a gas turbine, for example. The rotary machine 1 includes a compressor 2, a combustor 3, a turbine 4, a rotor 5, and a shaft sealing device 10A.

The compressor 2 compresses air by taking in a large amount of air. The combustor 3 burns fuel by mixing the fuel with the air compressed by the compressor 2. The turbine 4 is introduced with combustion gas generated in the combustor 3. The turbine 4 converts thermal energy of the introduced combustion gas into rotational energy, and generates power for rotating the rotor 5 around a central axis O. The rotor 5 extends in a columnar shape in an axial direction Da in which the central axis O extends. The rotor 5 transmits part of the power for rotating the turbine 4 to the compressor 2 to drive the compressor 2.

More specifically, the turbine 4 includes a rotating blade 7b, a stator vane 6b, and a casing 8. The rotating blade 7b is disposed on an outer side Dro in a radial direction Dr with respect to the rotor 5. The turbine 4 blows the combustion gas to the rotating blade 7b to convert the thermal energy of the combustion gas into mechanical rotational energy and to generate power. The casing 8 is formed in a tubular shape extending in the axial direction Da. The stator vane 6b is disposed on an inner side Dri in the radial direction Dr with respect to the casing 8. The rotating blade 7b and the stator vane 6b are alternately arranged in the axial direction Da. The rotating blade 7b receives a pressure of the combustion gas flowing in the axial direction Da of the rotor 5 to rotate the rotor 5 around the central axis O. The rotational energy applied to the rotor 5 is taken out from a shaft end and used.

For convenience of the following description, the direction in which the central axis O extends is referred to as the axial direction Da. Further, the radial direction of the rotor 5 or the shaft sealing device 10A based on the central axis is simply referred to as the radial direction Dr. Further, a side approaching the central axis O in the radial direction Dr is referred to as the inner side Dri in the radial direction Dr, and a side opposite to the inner side Dri in the radial direction Dr is referred to as the outer side Dro in the radial direction Dr. Further, the circumferential direction of the rotor 5 or the shaft sealing device 10A about the central axis O is simply referred to as the circumferential direction Dc.

The compressor 2 is coaxially connected to the turbine 4 via the rotor 5. The compressor 2 uses the rotation of the turbine 4 to compress outside air to generate compressed air. The compressor 2 supplies the generated compressed air to the combustor 3. Similarly to the turbine 4, the compressor 2 includes a stator vane 6a, a rotating blade 7a, and a casing 9. The rotating blade 7a is disposed on the outer side Dro in the radial direction Dr with respect to the rotor 5. The casing 9 extends in a tubular shape in the axial direction Da. The stator vane 6a is disposed on the inner side Dri in the radial direction Dr with respect to the casing 9. The rotating blade 7a and the stator vane 6a are alternately arranged in the axial direction Da of the rotor 5.
(Configuration of Shaft Sealing Device)

The shaft sealing device 10A seals an annular space between the rotor 5 and a stator for covering the rotor 5 in order to reduce a leakage amount of a fluid leaking from a high-pressure side to a low-pressure side. In the turbine 4, the shaft sealing device 10A is disposed to reduce a leakage amount of the combustion gas leaking from the high-pressure side to the low-pressure side. The shaft sealing device 10A is disposed in the turbine 4 between the stator vane 6b of the turbine 4 and the rotor 5, or between the casing 8 of the turbine 4 and the rotor 5. In the compressor 2, the shaft sealing device 10A is disposed to reduce the leakage amount of the compressed air leaking from the high-pressure side to the low-pressure side. In the compressor 2, the shaft sealing device 10A is disposed between the stator vane 6a of the compressor 2 and the rotor 5, or between the casing 9 and the rotor 5 of the compressor 2.

Figure 2:
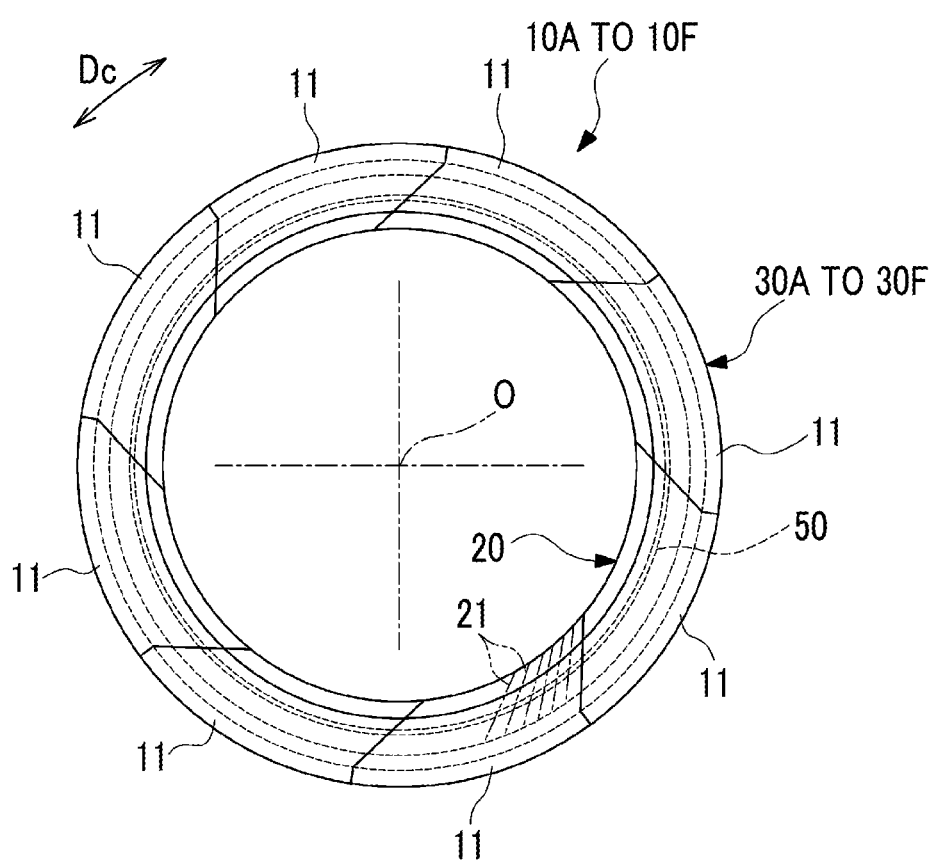
FIG. 2 is a view illustrating a shaft sealing device as seen from an axial direction of a rotor.

As illustrated in FIG. 2, the shaft sealing device 10A of the present embodiment has a plurality of (in the present embodiment, 8) divided bodies 11 extending in an arc shape. The shaft sealing device 10A is formed in an annular shape in the circumferential direction Dc around the central axis O with the divided bodies 11 arranged in the circumferential direction Dc.

Figure 3:
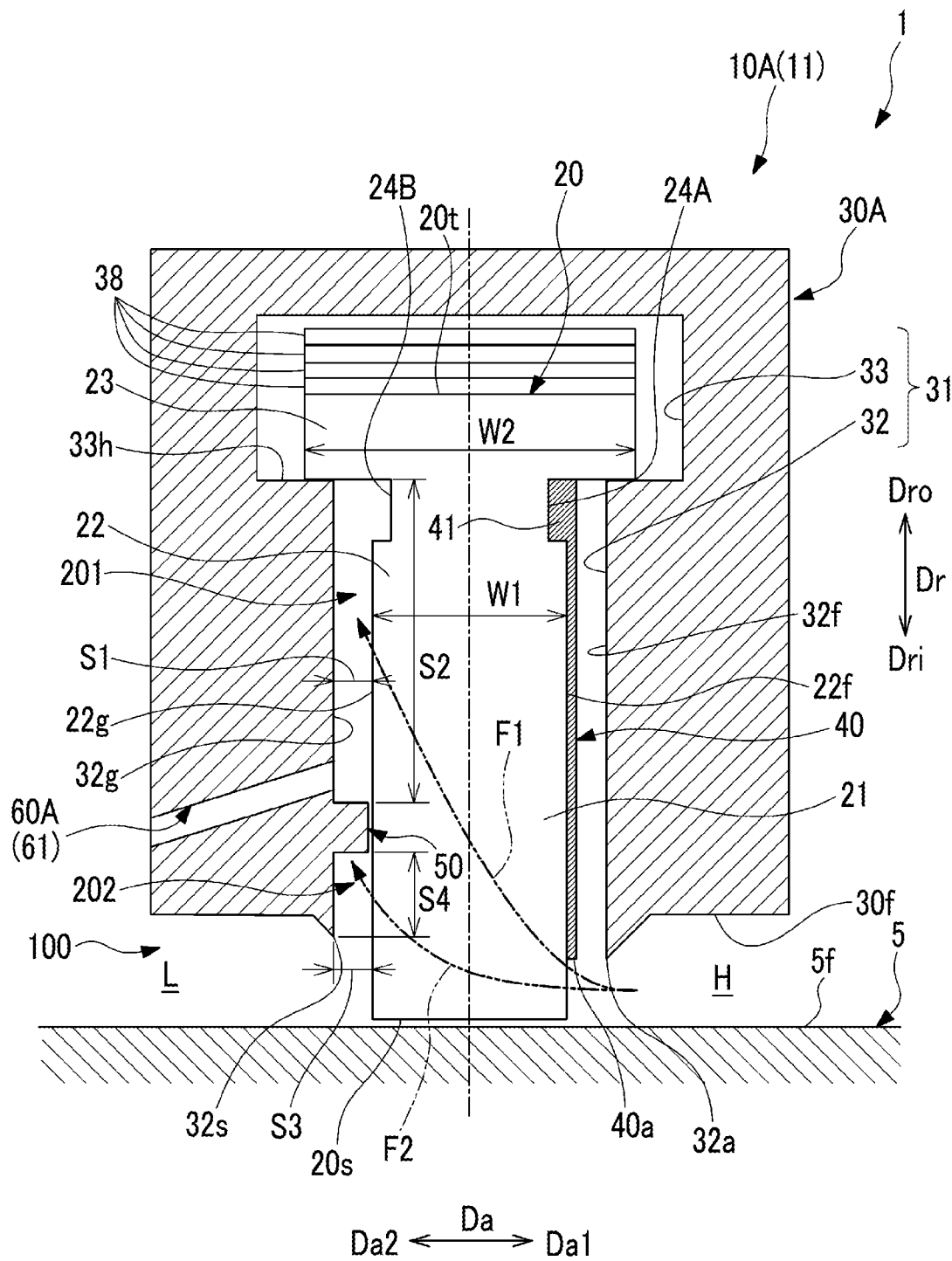
FIG. 3 is a sectional view of a shaft sealing device according to a first embodiment of the present disclosure.

As illustrated in FIG. 3, each divided body 11 of the shaft sealing device 10A includes a housing 30A, a sealing body 20, a shim 38, a side plate 40, and a convex portion 50.

The housing 30A forms an outer shell in the shaft sealing device 10A. The housing 30A is disposed on the outer side Dro in the radial direction Dr at an interval with respect to the rotor 5. As illustrated in FIG. 1, the housing 30A is disposed on the inner side Dri in the radial direction Dr with respect to the stator vanes 6a and 6b, the rotating blades 7a and 7b, and the casings 8 and 9, which serve as the stator of the rotary machine 1. The housing 30A may be formed as a part of the stator vanes 6a and 6b, the rotating blades 7a and 7b, and the casings 8 and 9, or may be formed as separate members.

As illustrated in FIG. 2, the housing 30A extends in the circumferential direction Dc around the central axis O. As illustrated in FIG. 3, the housing 30A has an accommodating groove 31 for accommodating a part of the sealing body 20. The accommodating groove 31 is recessed from an inner peripheral surface 30f, which faces the inner side in the radial direction Dr, to the outer side Dro in the radial direction Dr within the housing 30A. The accommodating groove 31 has a main body accommodating portion 32 that accommodates a main body portion 22 of the sealing body 20, which will be described later, and a head accommodating portion 33 that accommodates a head portion 23 of the sealing body 20.

The main body accommodating portion 32 forms a space in the inner side Dri in the radial direction Dr within the accommodating groove 31. The main body accommodating portion 32 is open at the inner peripheral surface 30f of the housing 30A. The head accommodating portion 33 forms a space in the outer side Dro in the radial direction Dr with respect to the main body accommodating portion 32. The head accommodating portion 33 is connected to the main body accommodating portion 32. The head accommodating portion 33 is formed to be widened on both sides in the axial direction Da with respect to the main body accommodating portion 32. As a result, the accommodating groove 31 including the main body accommodating portion 32 and the head accommodating portion 33 forms a space having a T-shaped cross section when viewed from the circumferential direction Dc.

The sealing body 20 is formed by laminating a plurality of thin plates 21 constituting a leaf seal in the circumferential direction Dc. Each of the plurality of thin plates 21 is formed of a metal plate. The plurality of thin plates 21 are disposed with a minute gap in the circumferential direction Dc. Each of the thin plates 21 is disposed along a plane orthogonal to the circumferential direction Dc and the radial direction. When viewed from the axial direction Da, each of the thin plates 21 is obliquely disposed in a radiation direction (radial direction Dr) about the central axis O. Each of the thin plates 21 obliquely extends from the other side to one side in the circumferential direction Dc from the outer side Dro toward the inner side Dri in the radial direction Dr. The thin plates 21 are joined to each other by, for example, welding at an end portion on the outer side Dro in the radial direction Dr. The sealing body 20 formed of the plurality of thin plates 21 extends in the circumferential direction Dc as a whole in one divided body 11, and is formed in an arc shape when viewed from the axial direction Da.

The sealing body 20 has the main body portion 22 and the head portion 23. The main body portion 22 has a constant width dimension W1 in the axial direction Da when viewed from the circumferential direction Dc. The main body portion 22 extends in the radial direction Dr longer than the width dimension W1. The main body portion 22 has a rectangular shape in the radial direction Dr that is longer than that in the axial direction Da when viewed from the circumferential direction Dc. The head portion 23 is formed on the outer side Dro in the radial direction Dr with respect to the main body portion 22. The head portion 23 is formed integrally with the main body portion 22. The head portion 23 protrudes to both sides of the main body portion 22 in the axial direction Da when viewed from the circumferential direction Dc. A width dimension W2 of the head portion 23 in the axial direction Da is larger than the width dimension W1 of the main body portion 22. The head portion 23 has a rectangular shape in the axial direction Da that is longer than that in the radial direction Dr when viewed from the circumferential direction Dc.

The sealing body 20 has a first concave portion 24A and a second concave portion 24B, which are recessed in the axial direction Da, on an end portion on the outer side Dro in the radial direction Dr of the main body portion 22. The end portion of the main body portion 22 on the outer side Dro in the radial direction Dr is an end portion close to a boundary between the main body portion 22 and the head portion 23. The first concave portion 24A is formed in a surface of the main body portion 22 facing a first side Da1 in the axial direction Da. The first concave portion 24A is formed to be recessed on a second side Da2 in the axial direction Da. The second concave portion 24B is formed in the surface of the main body portion 22 facing the second side Da2 in the axial direction Da. The second concave portion 24B is formed to be recessed on the first side Da1 in the axial direction Da. The second concave portion 24B is formed at the same position as the first concave portion 24A in the radial direction Dr when viewed from the circumferential direction Dc. Therefore, when viewed in the circumferential direction Dc, the main body portion 22 has a length in the axial direction Da that is shorter than the width dimension W1 only in a region where the first concave portion 24A and the second concave portion 24B are formed.

In the sealing body 20, an outer peripheral end portion 20t on the outer side Dro in the radial direction Dr is accommodated in the accommodating groove 31. The outer peripheral end portion 20t is an end of the head portion 23 on the outer side Dro in the radial direction. In the sealing body 20, most of the main body portion 22 is accommodated in the main body accommodating portion 32, and the head portion 23 is accommodated in the head accommodating portion 33. In the sealing body 20, an inner peripheral end portion 20s of the main body portion 22 on the inner side Dri in the radial direction Dr protrudes from the inner peripheral surface 30f of the housing 30A to the inner side Dri in the radial direction Dr. The inner peripheral end portion 20s is an end of the main body portion 22 on the inner side Dri in the radial direction. As a result, the inner peripheral end portion 20s of the sealing body 20 is disposed to come into slidable contact with an outer peripheral surface 5f of the rotor 5. That is, ends of the plurality of thin plates 21 on the inner side Dri in the radial direction Dr are disposed to come into slidable contact with the outer peripheral surface 5f of the rotor 5.

The sealing body 20 seals an annular space 100 between the rotor 5 and the housing 30A so as to partition the annular space 100 into a high-pressure region H on the first side Da1 in the axial direction Da and a low-pressure region L on the second side Da2 in the axial direction Da. The high-pressure region H is a region where the pressure is higher than that in the low-pressure region L. The positions of the high-pressure region H and the low-pressure region L in the axial direction Da may differ depending on the position where the shaft sealing device 10A is disposed. Therefore, the first side Da1 of the shaft sealing device 10A in the axial direction Da (a side of the sealing body 20 where the high-pressure region H is positioned) and the second side Da2 (a side of the sealing body 20 where the low-pressure region L is positioned) may be opposite to those in FIG. 3 when viewed based on the rotary machine 1.

In the accommodating groove 31, the main body portion 22 has a sealing body high-pressure-side side surface 22f facing the first side Da1 in the axial direction Da, and a sealing body low-pressure-side side surface 22g facing the second side Da2 in the axial direction Da. In fact, the sealing body high-pressure-side side surface 22f and the sealing body low-pressure-side side surface 22g are regions where side surfaces of the plurality of thin plates 21 are assembled, and are not one continuous surface.

Moreover, the accommodating groove 31 in which the sealing body 20 is accommodated has a low-pressure-side facing surface (facing surface) 32g facing the second side Da2 in the axial direction Da at an interval with respect to the sealing body low-pressure-side side surface 22g. That is, the low-pressure-side facing surface 32g is a surface facing the first side Da1 in the axial direction Da. An end portion 32s of the low-pressure-side facing surface 32g on the inner side Dri in the radial direction Dr is disposed at a position protruding from the inner peripheral surface 30f to the inner side Dri in the radial direction Dr so as to be positioned closest to the rotor 5 in the radial direction Dr within the housing 30A.

Furthermore, the accommodating groove 31 has a high-pressure-side facing surface 32*f* facing the first side Da1 in the axial direction Da with respect to the sealing body high-pressure-side side surface 22*f* at an interval. That is, the high-pressure-side facing surface 32*f* is a surface facing the second side Da2 in the axial direction Da. An end portion 32*a* of the high-pressure-side facing surface 32*f* on the inner side Dri in the radial direction Dr is disposed at a position protruding from the inner peripheral surface 30*f* to the inner side Dri in the radial direction Dr so as to be positioned closest to the rotor 5 in the radial direction Dr within the housing 30A. In the present embodiment, the end portion 32*a* of the high-pressure-side facing surface 32*f* is disposed at approximately the same position as the end portion 32*s* of the low-pressure-side facing surface 32*g* in the radial direction Dr.

The low-pressure-side facing surface 32*g* and the high-pressure-side facing surface 32*f* form a part of the inner peripheral surface of the accommodating groove 31. More specifically, the low-pressure-side facing surface 32*g* and the high-pressure-side facing surface 32*f* form a part of the main body accommodating portion 32. The main body portion 22 of the sealing body 20 is disposed with a gap in the axial direction Da with respect to both the low-pressure-side facing surface 32*g* and the high-pressure-side facing surface 32*f* of the accommodating groove 31. In the sealing body 20, the head portion 23 is formed on the outer side Dro in the radial direction Da, which is closer to the sealing body high-pressure-side side surface 22*f* and the sealing body low-pressure-side side surface 22*g*.

Moreover, the head accommodating portion 33 in which the head portion 23 is accommodated has an outer peripheral contact surface 33*h* facing the outer side Dro in the radial direction Dr. The head portion 23 comes into contact with the outer peripheral contact surface 33*h* in the head accommodating portion 33 from the outer side Dro in the radial direction Dr. The outer peripheral contact surface 33*h* is formed on a part that extends to both sides of the main body accommodating portion 32 in the axial direction Da. That is, the outer peripheral contact surface 33*h* extends from the end portion of the low-pressure-side facing surface 32*g* on the outer side Dro in the radial direction Dr toward the second side Da2 in the axial direction Da, when viewed from the circumferential direction Dc.

The shim 38 is a thin plate-shaped member. The shim 38 is disposed on the outer side Dro in the radial direction Dr with respect to the head portion 23. The shim 38 is disposed in the head accommodating portion 33 in a direction in which the radial direction Dr is a thickness direction. The shim 38 is disposed on the outer side Dro in the radial direction Dr with respect to the head portion 23. A plurality of shims 38 (for example, 5 in the present embodiment) are laminated in the radial direction Dr as needed. The shim 38 restricts movement of the head portion 23 to the outer side Dro in the radial direction Dr within the head accommodating portion 33. The plurality of shims 38 restrict the movement of the sealing body 20 to the outer side Dro in the radial direction Dr by a certain dimension or more.

The side plate 40 is disposed on the first side Da1 in the axial direction Da with respect to the sealing body 20. Only one side plate 40 of the present embodiment is disposed only on the first side Da1 in the axial direction Da with respect to the sealing body 20. The side plate 40 is disposed in the accommodating groove 31 along the sealing body high-pressure-side side surface 22*f*. The side plate 40 extends in the circumferential direction Dc and the radial direction Dr. An end portion 40*a* of the side plate 40 on the inner side Dri in the radial direction Dr is disposed at substantially the same position as the end portion 32*a* of the high-pressure-side facing surface 32*f* on the inner side Dri in the radial direction Dr. The side plate 40 has an engaging convex portion 41 that engages with the first concave portion 24A on the outer side Dro in the radial direction Dr. The engaging convex portion 41 is a region of the side plate 40 that protrudes to the second side Da2 in the axial direction Da. The engaging convex portion 41 is formed on the side plate 40 to include an end portion on the outer side Dro in the radial direction Dr.

The convex portion 50 restricts the movement of the sealing body 20 to the second side Da2 in the axial direction Da between the housing 30A and the sealing body 20. In the accommodating groove 31, the convex portion 50 is formed on any one of the housing 30A and the sealing body 20. In the present embodiment, the convex portion 50 is formed on, for example, the low-pressure-side facing surface 32*g* of the housing 30A. The convex portion 50 protrudes from the low-pressure-side facing surface 32*g* to the first side Da1 in the axial direction Da. The convex portion 50 extends in the circumferential direction Dc. The convex portion 50 is disposed on the outer side Dro in the radial direction Dr, which is closer to the end portion 32*s* of the low-pressure-side facing surface 32*g* on the inner side Dri in the radial direction Dr, when viewed from the circumferential direction Dc. The convex portion 50 is disposed on the outer side Dro in the radial direction Dr, which is closer to the end portion 40*a* of the side plate 40 on the inner side Dri in the radial direction Dr, when viewed from the circumferential direction Dc. Therefore, the convex portion 50 abuts against the sealing body low-pressure-side side surface 22*g* to restrict the movement of the sealing body 20 to the second side Da2 in the axial direction Da.

The convex portion 50 may be formed on the sealing body 20. In this case, the convex portion 50 is formed on the sealing body low-pressure-side side surface 22*g* of the sealing body 20 to protrude to the second side Da2 in the axial direction Da. The convex portion 50 abuts against the low-pressure-side facing surface 32*g* to restrict the movement of the sealing body 20 to the second side Da2 in the axial direction Da.

Moreover, in the accommodating groove 31, the convex portion 50 partitions a space between the low-pressure-side facing surface 32*g* and the sealing body low-pressure-side side surface 22*g* into a first space portion 201 on the outer side Dro in the radial direction Dr and a second space portion 202 on the inner side Dri in the radial direction Dr. The first space portion 201 is a space adjacent to the head accommodating portion 33 on the outer side Dro in the radial direction Dr. The second space portion 202 is a space communicating with the low-pressure region L on the inner side Dri in the radial direction Dr.

In the present embodiment, a dimension S1 of the first space portion 201 in the axial direction Da is set to, for example, 0.1 to 0.3 mm.

A dimension S3 of the second space portion 202 in the axial direction Da is, for example, preferably 2.0 times to 4.0 times the dimension S1 of the first space portion 201. In the present embodiment, the dimension S3 is set to, for example, 0.2 to 0.6 mm.

Moreover, a dimension S4 of the second space portion 202 in the radial direction Dr is preferably a constant value regardless of a size of the shaft sealing device 10A. For example, when the dimension S4 has a design value of about 5.0 mm, it is preferable that the dimension S4 is within a range of about a 10 to 30% increase or decrease with respect to the design value. Therefore, in the present embodiment, the dimension S4 is set to, for example, about 2 to 8 mm.

Moreover, a dimension S2 of the first space portion 201 in the radial direction Dr preferably has about 70 to 90% of the length of the main body portion 22 in the radial direction Dr (a length from a connection position between the main body portion 22 and the head portion 23 to the inner peripheral end portion 20s in FIG. 3). In addition, the dimension S4 in the radial direction Dr is preferably about 10 to 30% with respect to the length of the main body portion 22 in the radial direction Dr.

The housing 30A further has a communication portion 60A which allows the low-pressure region L and the inside of the accommodating groove 31 to communicate with each other. The communication portion 60A allows the first space portion 201 and the low-pressure region L to communicate with each other. In the present embodiment, the communication portion 60A has at least one communication hole 61 formed such that one end thereof is open at the low-pressure-side facing surface 32g and the other end is open at an outer surface of the housing 30A facing the low-pressure region L. The communication hole 61 is connected to the low-pressure-side facing surface 32g on the outer side Dro in the radial direction Dr with respect to convex portion 50. In the present embodiment, the communication hole 61 extends obliquely toward the inner side Dri in the radial direction Dr from the first side Da1 toward the second side Da2 in the axial direction Da. Only one communication hole 61 is formed in the low-pressure-side facing surface 32g. The communication hole 61 is not limited to having an obliquely extended shape. The communication hole 61 may extend parallel to the central axis O from the first side Da1 toward the second side Da2 in the axial direction Da.

(Operational Effect)

In the shaft sealing device 10A and the rotary machine 1 having the above configuration, as illustrated in FIG. 3, a high-pressure working fluid exists in a region of the sealing body 20 on the first side Da1 in the axial direction Da, which is the high-pressure region H. The region of the sealing body 20 on the second side in the axial direction Da, which is the low-pressure region L, is in a state in which a pressure is lower than that in the high-pressure region H. Therefore, a flow of the working fluid from the high-pressure region H in the axial direction Da toward the low-pressure region L through a space between the thin plates 21 is generated through a slight gap between the thin plates 21 constituting the sealing body 20.

Moreover, the convex portion 50 partitions a space between the low-pressure-side facing surface 32g and the sealing body low-pressure-side side surface 22g into a first space portion 201 on the outer side Dro in the radial direction Dr and a second space portion 202 on the inner side Dri in the radial direction Dr. The second space portion 202 is connected to the low-pressure region L, and has a low pressure equivalent to that of the low-pressure region L. The low-pressure region L and the first space portion 201 communicate through the communication portion 60A, so that the first space portion 201 also has a low pressure equivalent to that of the low-pressure region L. Therefore, the first space portion 201 and the second space portion 202 have a pressure difference with reference to the high-pressure region H positioned with the sealing body 20 interposed therebetween in the axial direction Da. Thus, a first flow F1 of the working fluid toward the first space portion 201 and a second flow F2 of the working fluid toward the second space portion 202 are generated as a flow from the high-pressure region H toward the low-pressure region L.

The first flow F1 of the working fluid flowing from the high-pressure region H toward the first space portion 201 flows obliquely toward the outer side Dro in the radial direction Dr from the first side Da1 toward the second side Da2 in the axial direction Da, as compared with the second flow F2. The sealing body 20 is pressed by the first flow F1 so as to float slightly to the outer side Dro in the radial direction Dr with respect to the outer peripheral surface 5f of the rotor 5. As a result, it is possible to suppress the inner peripheral end portion 20s of the sealing body 20 from coming into strong contact with the outer peripheral surface 5f of the rotor 5. Therefore, wear of the sealing body 20 is suppressed.

Moreover, the second space portion 202 is formed to be connected to the low-pressure region L at a position close to the outer peripheral surface 5f of the rotor 5. Therefore, the second flow F2 of the working fluid from the high-pressure region H toward the second space portion 202 flows relatively straight from the first side Da1 to the second side Da2 in the axial direction Da so as to follow the outer peripheral surface 5f of the rotor 5, as compared with the first flow F1. The first flow F1 obliquely flowing toward the outer side Dro in the radial direction Dr and the second flow F2 flowing in a direction different to that of the first flow F1 can sufficiently secure a force that floats the sealing body 20 to the outer side Dro in the radial direction Dr. As a result, it is possible to stably suppress the inner peripheral end portion 20s of the sealing body 20 from coming into strong contact with the outer peripheral surface 5f of the rotor 5. Therefore, wear of the sealing body 20 can be suppressed more effectively.

Moreover, the convex portion 50 abuts against the sealing body 20 to suppress the movement of the sealing body 20 to the second side Da2 in the axial direction Da. Therefore, the sealing body 20 is suppressed from losing its posture in the accommodating groove 31. As a result, the sealing body 20 is tilted in the accommodating groove 31, thereby suppressing the formation of a gap which connects the high-pressure region H to the first space portion 201 through the inside of the accommodating groove 31. Therefore, it is possible to suppress the working fluid from flowing from the high-pressure region H to the first space portion 201 while going around the sealing body 20 from the head accommodating portion 33 in the accommodating groove 31. As a result, even when the number of components constituting the shaft sealing device 10A is reduced without providing a separate member such as a holding ring or a low-pressure side seal, the flow of the working fluid around the sealing body 20 can be appropriately maintained. Accordingly, it is possible to reduce the number of components and to reduce costs while suppressing wear of the sealing body 20. Furthermore, by providing the shaft sealing device 10A, it is possible to provide the rotary machine 1 capable of reducing costs while suppressing wear of the sealing body 20.

Moreover, the convex portion 50 is disposed on the outer side Dro in the radial direction Dr with respect to the end portion 40a of the side plate 40 on the inner side Dri in the radial direction Dr disposed along the sealing body high-pressure-side side surface 22f. Accordingly, the first space portion 201 is formed on the outer side Dro in the radial direction Dr, which is close to the end portion 40a of the side plate 40. Therefore, the first space portion 201 is largely positioned on the outer side Dro in the radial direction Dr with respect to the high-pressure region H which is an inlet. Thus, the first flow F1 of the working fluid from the high-pressure region H toward the first space portion 201 is a flow that is further toward the outer side Dro in the radial direction Dr. As a result, a force of floating the sealing body 20 to the outer peripheral surface 5f of the rotor 5 due to the first flow F1 becomes stronger. As a result, it is possible to stably suppress the inner peripheral end portion 20s of the sealing body 20 from coming into strong contact with the outer peripheral surface 5f of the rotor 5. Therefore, wear of the sealing body 20 can be suppressed more effectively.

Moreover, the convex portion 50 is formed on the low-pressure-side facing surface 32g. Accordingly, the sealing body low-pressure-side side surface 22g abuts against the convex portion 50 formed on the low-pressure-side facing surface 32g to restrict the movement of the sealing body 20 to the second side Da2 in the axial direction Da. Therefore, it is possible to suppress a posture of the sealing body 20 from collapsing in the accommodating groove 31. In addition by forming the convex portion 50 on the housing 30A, it is possible to reduce the complexity of the shape of the plurality of thin plates 21 constituting the sealing body 20. Accordingly, the sealing body 20 can be manufactured at low costs.

Moreover, the communication portion 60A has the communication hole 61 formed such that one end thereof is open at the low-pressure-side facing surface 32g and the other end is open at the outer surface of the housing 30A facing the low-pressure region L. Accordingly, the first space portion 201 communicates with the low-pressure region L through the communication hole 61. Therefore, the pressure inside the first space portion 201 can be made equivalent to that of the low-pressure region L with a simple structure.

Moreover, the head portion 23 of the sealing body 20 comes into contact with the outer peripheral contact surface 33h from the outer side Dro in the radial direction Dr of the head accommodating portion 33. The posture of the sealing body 20 in the accommodating groove 31 is maintained not only by the convex portion 50 but also by the head portion 23. Therefore, the sealing body 20 is tilted in the accommodating groove 31, thereby suppressing the formation of a gap which connects the high-pressure region H to the first space portion 201 through the inside of the accommodating groove 31. Furthermore, the head portion 23 comes into contact with the outer peripheral contact surface 33h of the head accommodating portion 33, so that it is possible to suppress the flow of the high-pressure working fluid from the high-pressure region H into the first space portion 201 that has passed through the head accommodating portion 33. Accordingly, it is possible to stably suppress the working fluid from flowing from the high-pressure region H to the first space portion 201 while going around the sealing body 20 from the head accommodating portion 33 in the accommodating groove 31.

First Modification Example of First Embodiment

In the first embodiment, the communication portion 60A has only one communication hole 61, but the configuration of the communication portion is not limited to such a structure.

Figure 4:
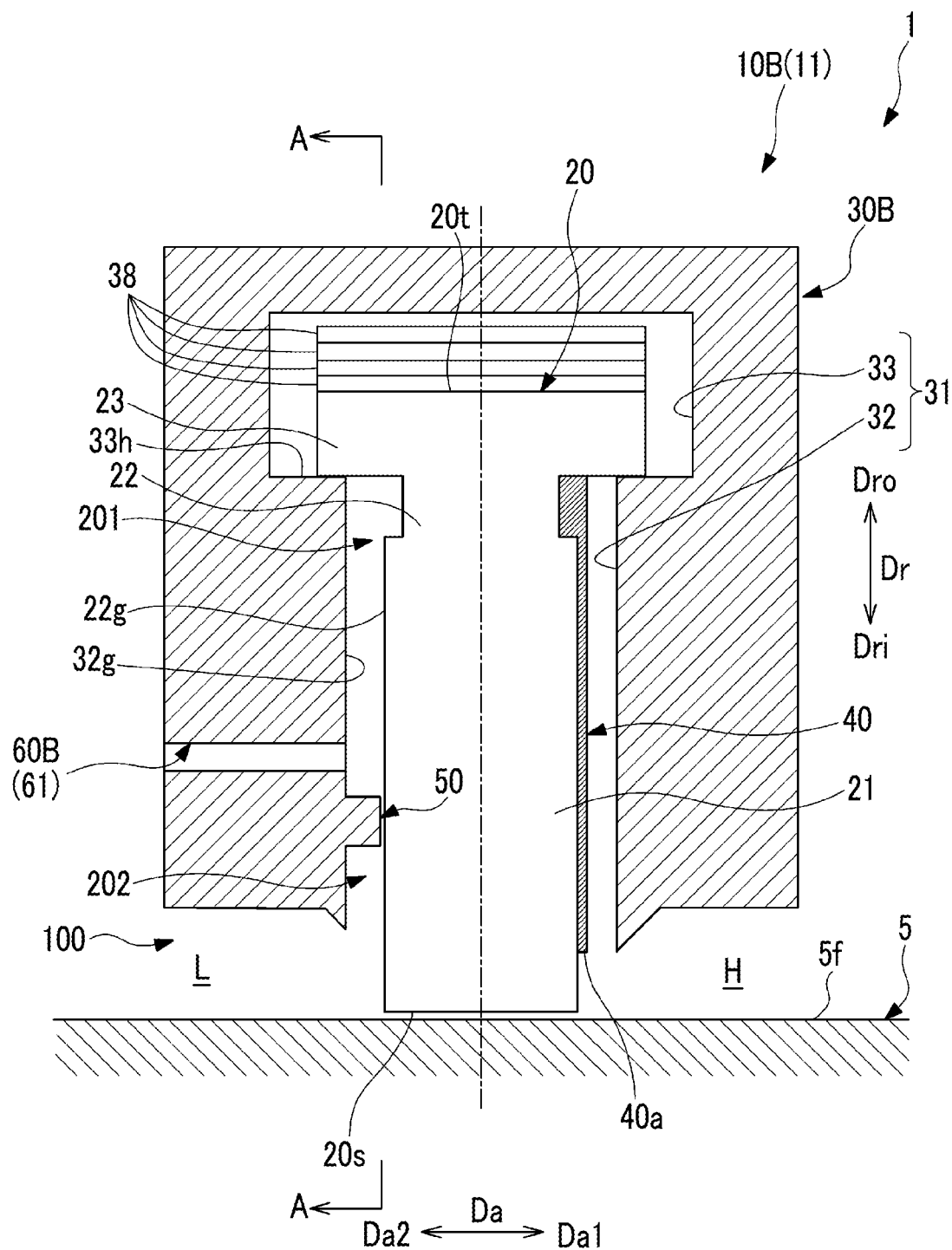
FIG. 4 is a sectional view of a shaft sealing device according to a first modification example of the first embodiment of the present disclosure.
Figure 5:
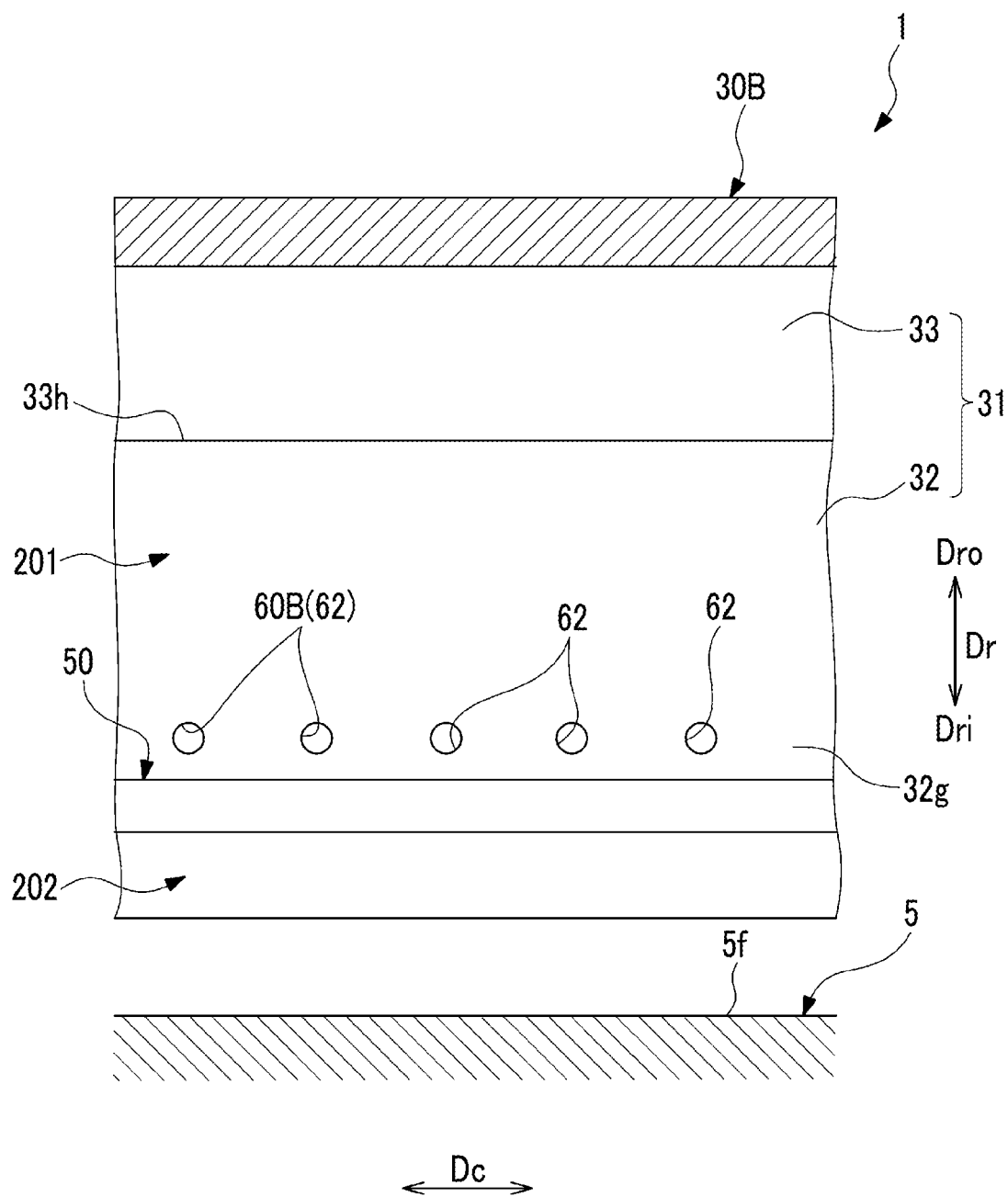
FIG. 5 is a view of a housing of the shaft sealing device in FIG. 4 as viewed from an arrow A-A.

For example, as illustrated in FIGS. 4 and 5, a housing 30B of a shaft sealing device 10B includes a plurality of communication holes 62 as a communication portion 60B. Each communication hole 62 extends in the axial direction Da, for example, so that one end thereof is open at the low-pressure-side facing surface 32g and the other end is open at the outer surface of the housing 30B facing the low-pressure region L. In this case, as illustrated in FIG. 5, the communication holes 62 are formed at equal intervals in the circumferential direction Dc on the outer side Dro in the radial direction Dr with respect to the convex portion 50. The communication hole 62 is not limited to having a shape extending parallel with the central axis O from the first side Da1 toward the second side Da2 in the axial direction Da. A plurality of communication holes 62 may extend obliquely toward the inner side Dri in the radial direction Dr from the first side Da1 toward the second side Da2 in the axial direction Da.

Accordingly, the first space portion 201 is connected to the low-pressure region L through the plurality of communication holes 62, one end of which being open at the low-pressure-side facing surface 32g and the other of which being open at the outer surface of the housing 30B facing the low-pressure region L. Therefore, as in the first embodiment, the pressure inside the first space portion 201 can be made equivalent to that of the low-pressure region L. Furthermore, the first space portion 201 is connected to the low-pressure region L through the plurality of communication holes 62, so that it is possible to suppress variation in pressure inside the first space portion 201 as compared with a case in which the first space portion 201 is connected to the low-pressure region L through one communication hole 61. Thus, the pressure inside the first space portion 201 can be reduced to a low pressure under a uniform pressure state.

Second Modification Example of First Embodiment

Figure 6:
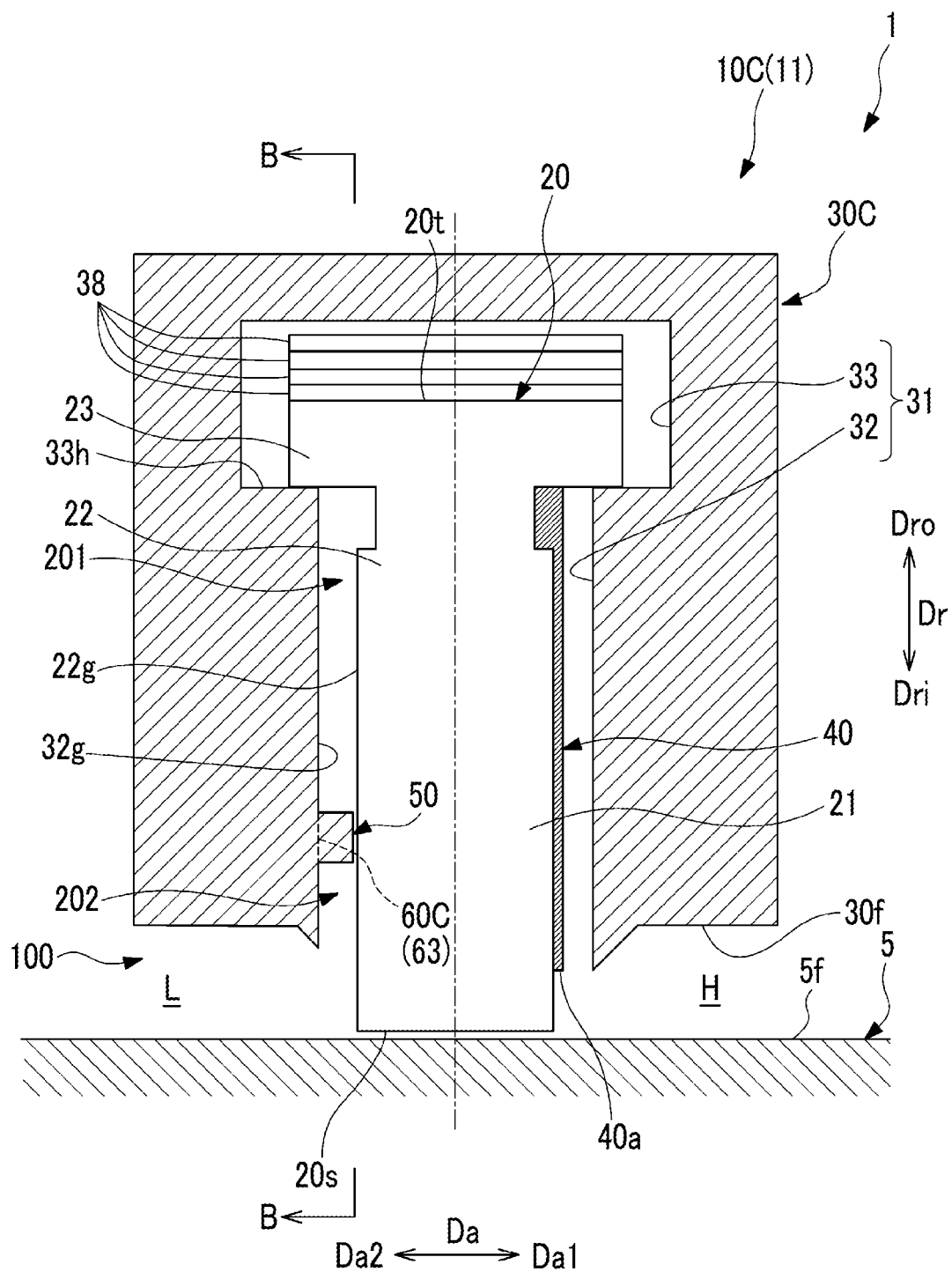
FIG. 6 is a sectional view of a shaft sealing device according to a second modification example of the first embodiment of the present disclosure.
Figure 7:
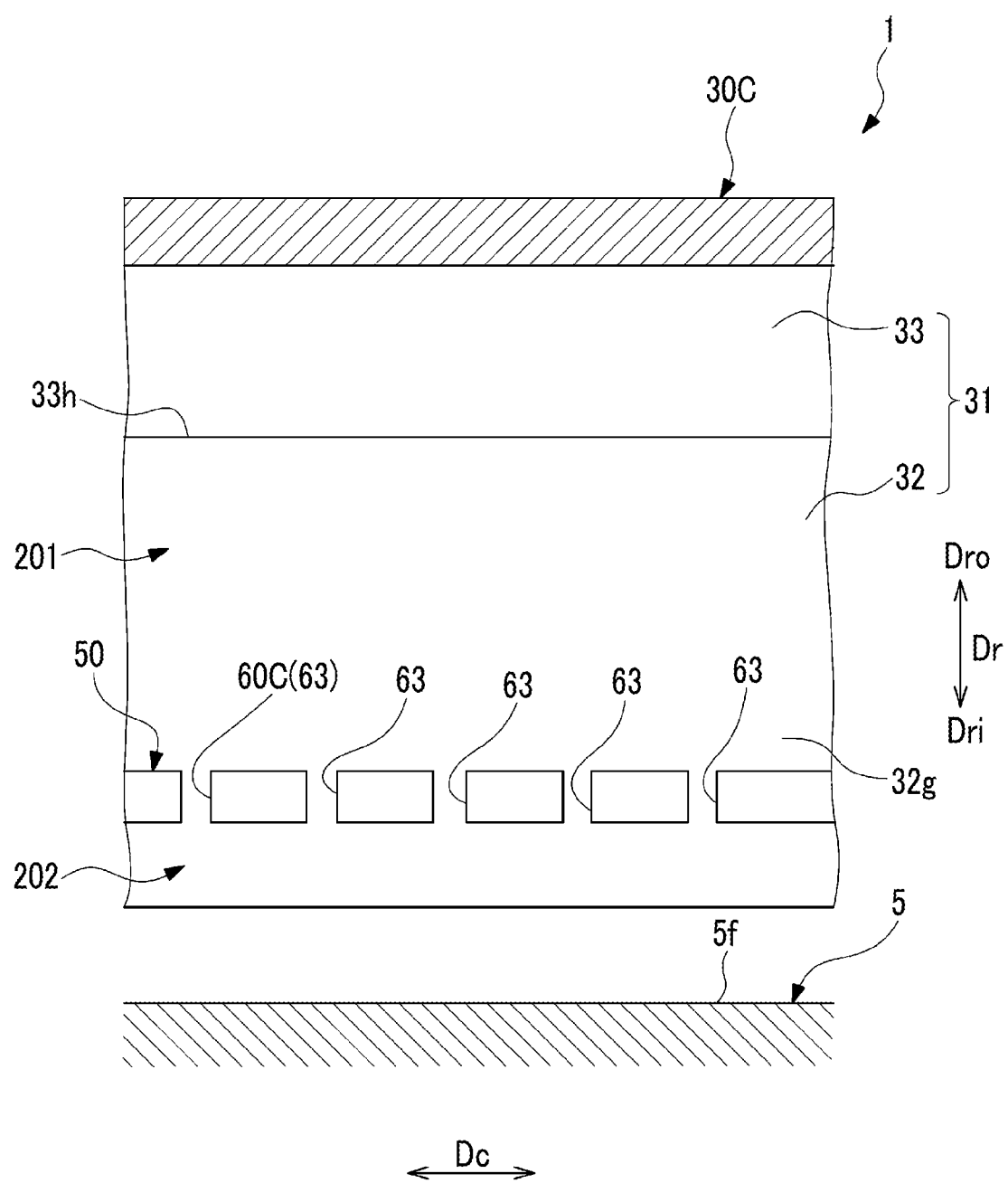
FIG. 7 is a view of a housing of the shaft sealing device in FIG. 6 as viewed from an arrow B-B.

As illustrated in FIGS. 6 and 7, a housing 30C of a shaft sealing device 10c includes a communication groove 63 as a communication portion 60C. The communication groove 63 is formed to pass therethrough the convex portion 50 in the radial direction Dr and allow the first space portion 201 and the second space portion 202 to communicate with each other. A plurality of communication grooves 63 are formed at intervals in the circumferential direction Dc.

Accordingly, the first space portion 201 communicates with the second space portion 202 through the communication groove 63 through which the convex portion 50 passes in the radial direction Dr. The second space portion 202 is connected to the low-pressure region L. Thus, the first space portion 201 is indirectly connected to the low-pressure region L via the second space portion 202. Therefore, as in the first embodiment, the pressure inside the first space portion 201 can be made equivalent to that of the low-pressure region L. Furthermore, the communication groove 63 is formed as a groove recessed from the convex portion 50, so that processing becomes easier than forming a through-hole that passes through the housing 30A, such as the communication hole 61 or 62. Therefore, the communication portion 600 can be formed more simply.

Furthermore, the second space portion 202 is connected to the low-pressure region L through the plurality of communication grooves 63, so that it is possible to suppress variation in pressure inside the first space portion 201 as compared with a case in which the second space portion 202 is connected to the low-pressure region L through one communication groove 63. Thus, the pressure inside the first space portion 201 can be reduced to a low pressure under a uniform pressure state.

The communication grooves 63 are not limited to the structure in which a plurality of the communication grooves 63 are formed at intervals in the circumferential direction Dc. Only one communication groove 63 may be formed in the convex portion 50.

Second Embodiment

Next, a second embodiment of a shaft sealing device 10D according to the present disclosure will be described. In the second embodiment to be described later, the same reference numerals are given to the configurations common to the configurations of the first embodiment in the drawings, and the description thereof will be omitted. The second embodiment is different from the first embodiment in that an outer peripheral convex portion 70 is provided.

Figure 8:
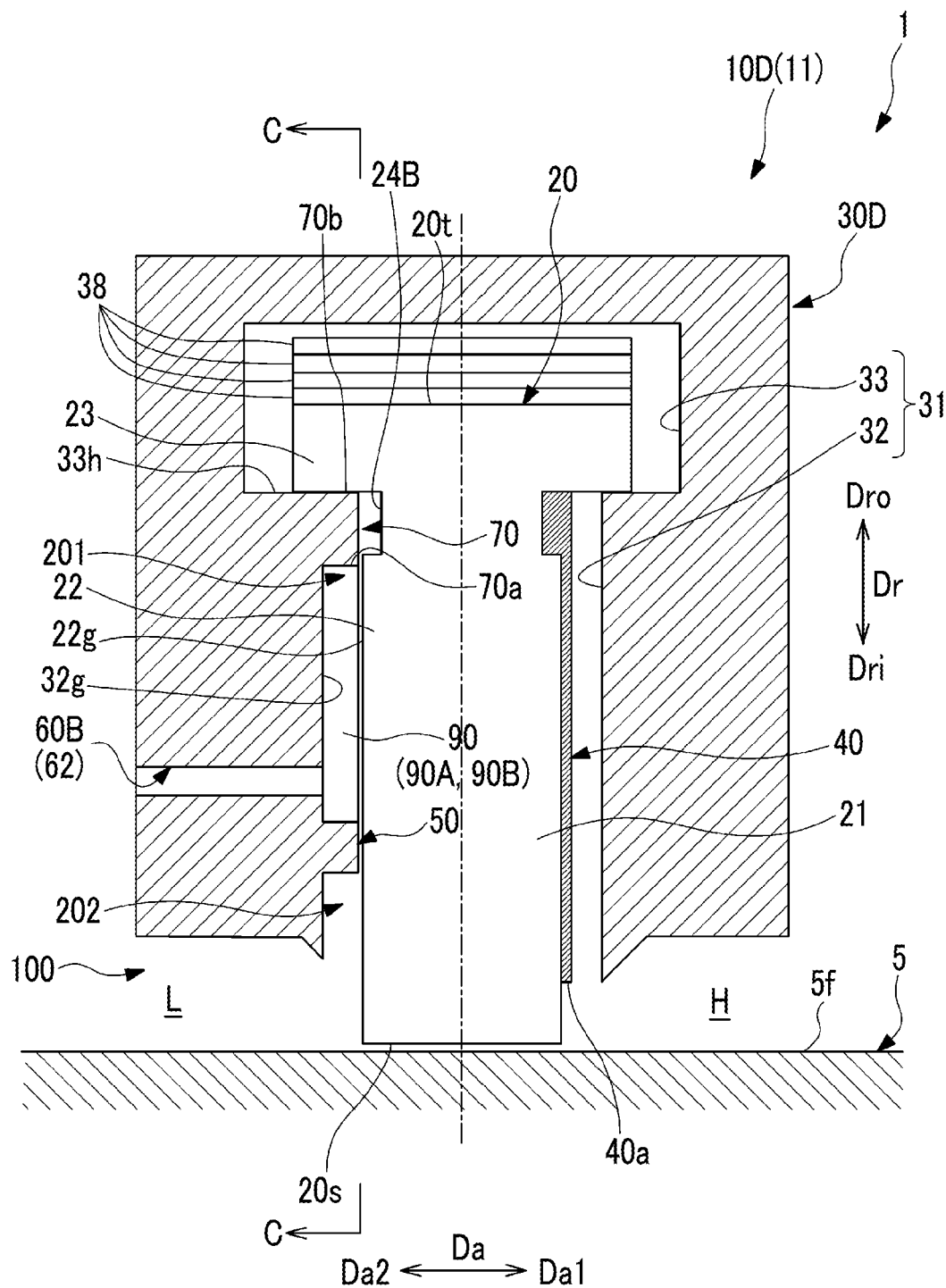
FIG. 8 is a sectional view of a shaft sealing device according to a second embodiment of the present disclosure.
Figure 9:
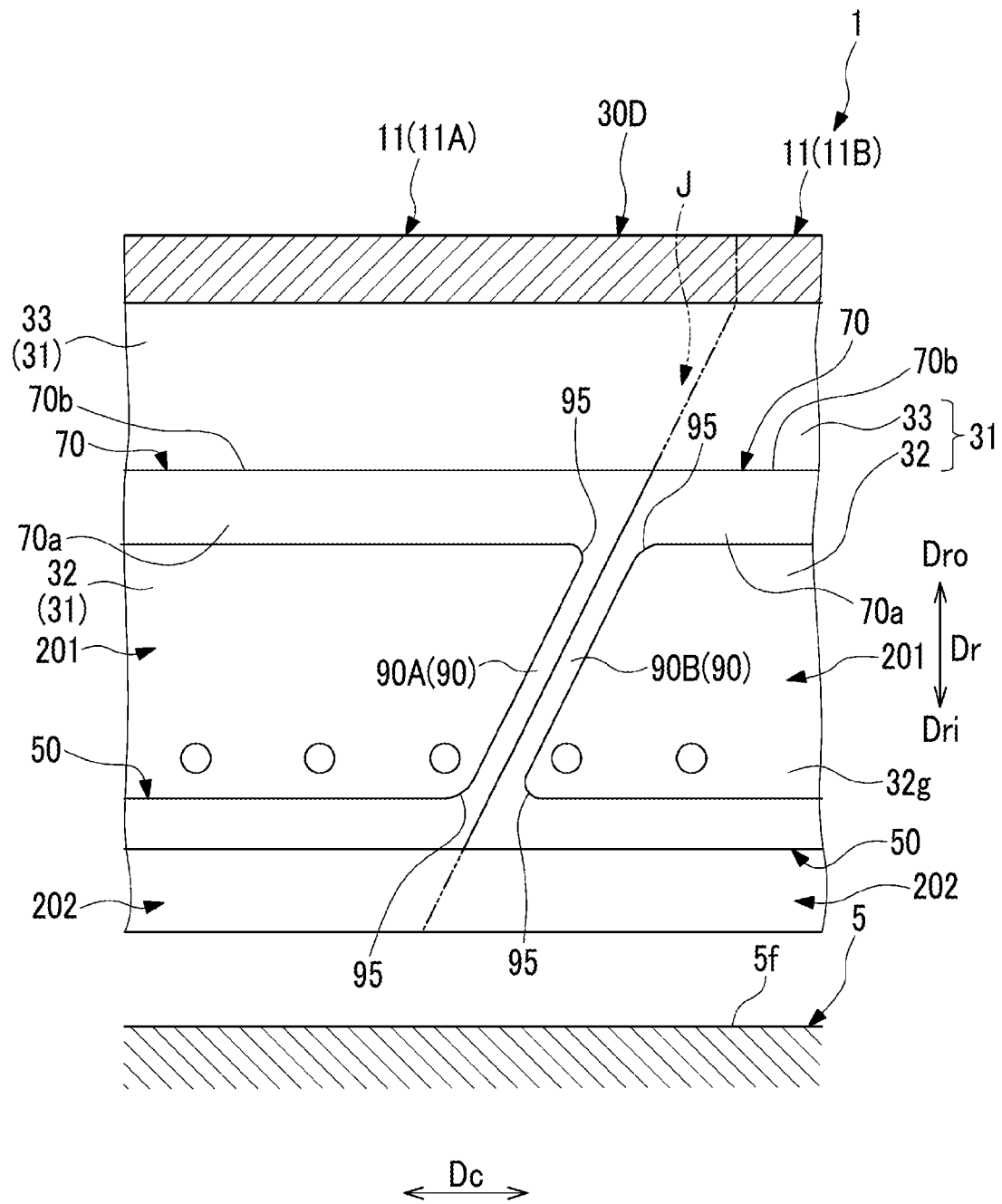
FIG. 9 is a view of a housing of the shaft sealing device in FIG. 8 as viewed from an arrow C-C.

As illustrated in FIGS. 8 and 9, a housing 30D of the shaft sealing device 10D of the second embodiment further includes the outer peripheral convex portion 70. The outer peripheral convex portion 70 is disposed on the outer side Dro in the radial direction Dr with respect to the convex portion 50. The outer peripheral convex portion 70 is formed at an end portion of the low-pressure-side facing surface 32g on the outer side Dro in the radial direction Dr. The outer peripheral convex portion 70 is formed to protrude from the low-pressure-side facing surface 32g to the first side Da1 in the axial direction Da. The outer peripheral convex portion 70 protrudes in the axial direction Da by the same protrusion amount as the convex portion 50 with respect to the low-pressure-side facing surface 32g. The outer peripheral convex portion 70 has a first surface 70a facing the first side Da1 in the axial direction Da. The first surface 70a abuts against the sealing body low-pressure-side side surface 22g of the sealing body 20. In addition, the outer peripheral convex portion 70 has a second surface 70b facing the outer side Dro in the radial direction Dr. The second surface 70b abuts against the head portion 23 of the sealing body 20 from the inner side Dri in the radial direction Dr. That is, the second surface 70b forms a surface that is continuous with the outer peripheral contact surface 33h.

In the second embodiment, the first space portion 201 is formed on the outer side Dro in the radial direction Dr of the convex portion 50 and on the inner side Dri in the radial direction Dr of the outer peripheral convex portion 70.

As illustrated in FIG. 9, the plurality of divided bodies 11 constituting the shaft sealing device 10D have a seam J that is formed between the adjacent divided bodies 11 in the circumferential direction Dc. The seam J obliquely and linearly extends in the radial direction Dr when viewed from the axial direction Da. In the embodiment, the seam J between the adjacent divided bodies 11 extends obliquely from one side to the other side in the circumferential direction Dc from the inner side Dri toward the outer side Dro in the radial direction Dr.

In the shaft sealing device 10D, a seam convex portion 90 is formed in a region overlapping with the seam J of the adjacent divided bodies 11 when viewed in the axial direction Da. The seam convex portion 90 is formed in each of one divided body (first divided body) 11A and the other divided body (second divided body) 11B among adjacent divided bodies 11 in the circumferential direction Dc. A seam convex portion 90A formed on one divided body 11A and a seam convex portion 90B formed on the other divided body 11B extend along the seam J from the inner side Dri to the outer side Dro in the radial direction Dr, respectively. Similarly to the convex portion 50 and the outer peripheral convex portion 70, the seam convex portion 90 protrudes from the low-pressure-side facing surface 32g to the first side Da1 in the axial direction Da. In this case, the convex portion 50, the outer peripheral convex portion 70, and the seam convex portion 90 preferably have the same protrusion dimensions from the low-pressure-side facing surface 32g to the first side Da1 in the axial direction Da. In addition, when viewed in the axial direction Da, a connecting part between the convex portion 50 and the seam convex portion 90 or a connecting part between the outer peripheral convex portion 70 and the seam convex portion 90 may be formed with an R portion 95 that forms a smooth curved surface.

When the seam convex portion 90 is formed, it is not limited to a structure in which both the convex portion 50 and the outer peripheral convex portion 70 are formed. For example, even when the seam convex portion 90 is formed, a structure may be such that the outer peripheral convex portion 70 is not formed and only the convex portion 50 is formed.

In the configuration as described above, the convex portion 50 and the outer peripheral convex portion 70 abut against the sealing body low-pressure-side side surface 22g. Accordingly, the posture of the sealing body 20 is maintained in the accommodating groove 31 not only by the convex portion 50 but also by the outer peripheral convex portion 70 disposed on the outer side Dro in the radial direction Dr with respect to the convex portion 50. Since the posture is maintained at two positions, the convex portion 50 and the outer peripheral convex portion 70 separated from each other in the radial direction Dr, the posture of the sealing body 20 can be maintained in a more stable posture in the accommodating groove 31.

Moreover, the outer peripheral convex portion 70 has a first surface 70a that abuts against the sealing body low-pressure-side side surface 22g, and a second surface 70b that abuts against the head portion 23 of the sealing body 20 from the inner side Dri in the radial direction Dr. Therefore, the working fluid reaching the first space portion 201 can be blocked at two positions of the first surface 70a and the second surface 70b such that the working fluid passes from the high-pressure region H through the head accommodating portion 33 and then goes around the sealing body 20. Therefore, the first space portion 201 can be stably maintained in a low-pressure state.

Moreover, the seam convex portion 90 is formed at a part of the seam J between the divided bodies 11. Accordingly, in each of the divided bodies 11 adjacent to each other in the circumferential direction Dc, the first space portion 201 is in a state of not being connected to (a state of not communicating with) a part of the seam J of the divided bodies 11. Thus, it is possible to suppress the working fluid in the first space portion 201 from leaking from the seam J to the outside of the housing 30D. As a result, it is possible to suppress the pressure state in the first space portion 201 from being changed by the seam J of the divided body 11.

Moreover, the connecting part between the convex portion 50 and the seam convex portion 90 or the connecting part between the outer peripheral convex portion 70 and the seam convex portion 90 are formed with an R portion 95 that forms a smooth curved surface. As a result, restrictions on tools when the seam convex portion 90 is formed on the convex portion 50 and the outer peripheral convex portion 70 can be reduced. As a result, the convex portion 50, the outer peripheral convex portion 70, and the seam convex portion 90 are likely to be integrally formed.

Modification Example of Second Embodiment

In the second embodiment, the outer peripheral convex portion 70 is formed at a position where the outer peripheral convex portion 70 abuts against the sealing body low-pressure-side side surface 22g. However, the structure of the outer peripheral convex portion is not limited to such a structure.

Figure 10:
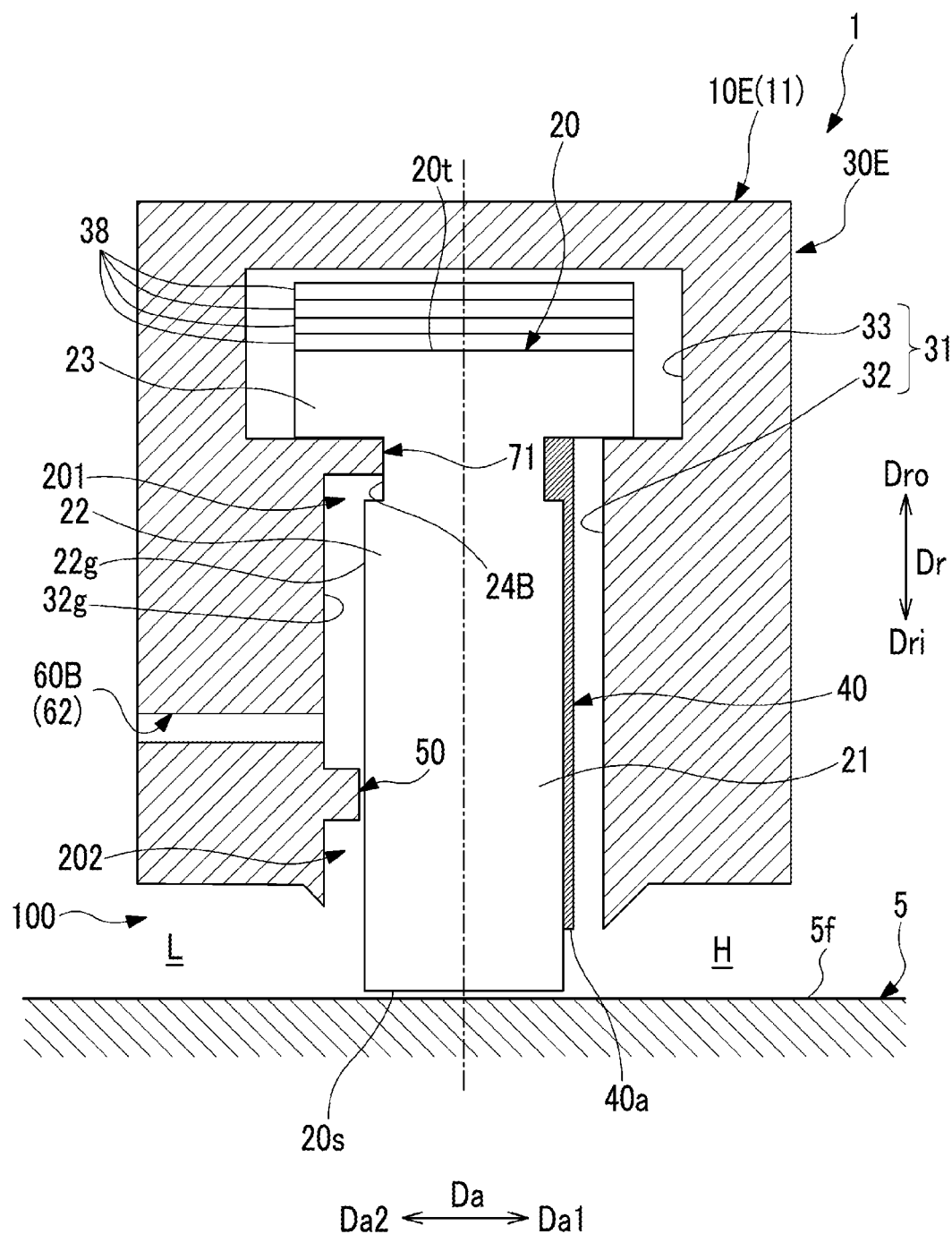
FIG. 10 is a sectional view of a shaft sealing device according to a modification example of the second embodiment of the present disclosure.

For example, as illustrated in FIG. 10, in a housing 30E of a shaft sealing device 10E, an outer peripheral convex portion 71 may be inserted into the second concave portion 24B of the sealing body 20. In this case, when the sealing body 20 moves to the second side Da2 in the axial direction Da, a tip portion of the outer peripheral convex portion 71 abuts against the main body portion 22 of the sealing body 20 in the second concave portion 24B.

Third Embodiment

Next, a third embodiment of a shaft sealing device according to the present disclosure will be described. In the second embodiment to be described later, the same reference numerals are given to the configurations common to the configurations of the first and second embodiments in the drawings, and the description thereof will be omitted. The third embodiment is different from the first embodiment in that a biasing member 80 is further provided.

Figure 11:
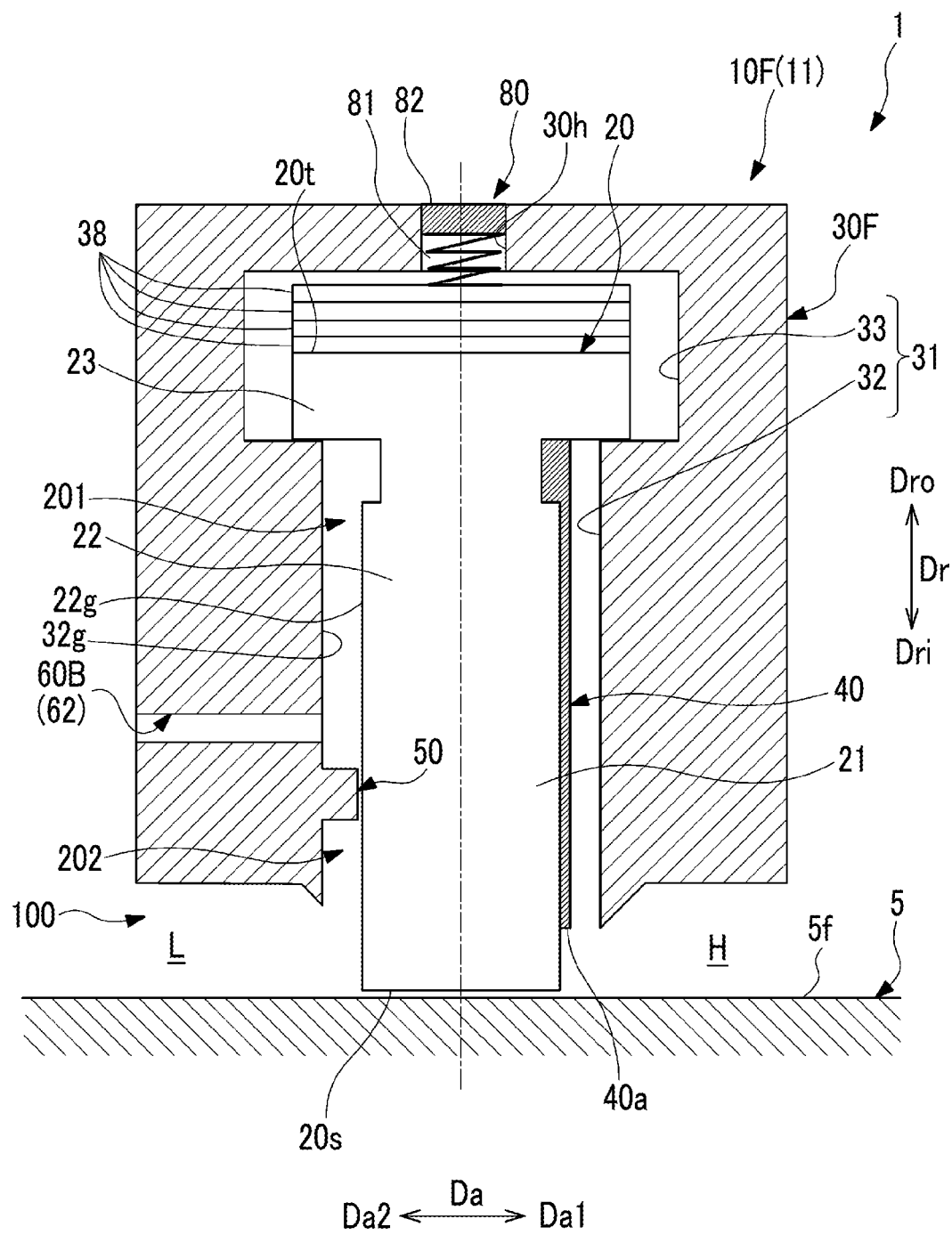
FIG. 11 is a sectional view of a shaft sealing device according to a third embodiment of the present disclosure.

As illustrated in FIG. 11, a shaft sealing device 10F of the third embodiment further includes the biasing member 80 that biases the sealing body 20 to the inner side Dri in the radial direction Dr within a housing 30F. The biasing member 80 is disposed inside the head accommodating portion 33 of the accommodating groove 31. The biasing member 80 includes, for example, a biasing member body 81 made of a coil spring and a fixing member 82 that fixes the biasing member body 81.

The biasing member body 81 is housed in an insertion hole 30h that is formed in the housing 30F to be recessed in the radial direction Dr with respect to the head accommodating portion 33 such that the biasing member body 81 is open in the head accommodating portion 33. The fixing member 82 is fastened and fixed to the housing 30F by being screwed into a female screw part formed in the insertion hole 30h. The biasing member body 81 is sandwiched between the fixing member 82 and the shim 38 in a compressed state, thereby biasing the sealing body 20 to the inner side Dri in the radial direction Dr with respect to the housing 30F.

By providing the biasing member 80 as described above, the sealing body 20 is in a state of being pushed toward the inner side Dri in the radial direction Dr while facing the outer peripheral surface 5f of the rotor 5. As a result, when the sealing body 20 is accommodated in the accommodating groove 31, excessive movement of the sealing body 20 to the outer side Dro in the radial direction Dr is suppressed by a reaction force when the inner peripheral end portion 20s of the sealing body 20 comes into contact with the outer peripheral surface 5f of the rotor 5. Accordingly, it is possible to suppress an excessive increase of a gap between the inner peripheral end portion 20s of the sealing body 20 and the outer peripheral surface 5f of the rotor 5 during operation of the compressor 2 or the turbine 4. Therefore, it is possible to stably maintain a state in which the inner peripheral end portion 20s of the sealing body 20 appropriately comes into slidable contact with the outer peripheral surface 5f of the rotor 5 and exhibits good sealing performance.

Other Embodiments

The embodiments of the present disclosure have been described in detail with reference to the drawings. However, the specific configuration is not limited to the embodiments of the present disclosure, and includes design changes and the like without departing from the gist of the present disclosure.

In the embodiment, an example of the rotary machine 1 includes a gas turbine, but is not limited thereto. Examples of the rotary machine 1 include a large-scale fluid machine such as a steam turbine, a compressor, a water wheel, a chiller, and a pump.

APPENDIX

The shaft sealing devices 10A to 10F and the rotary machine 1 described in each embodiment are understood as follows, for example.

(1) According g to a first aspect, shaft sealing devices 10A to 10F includes: housings 30A to 30F which are disposed on an outer side Dro in a radial direction Dr at an interval with respect to a rotor 5 being rotatable around a central axis O, extends in a circumferential direction Dc around the central axis O, and has an accommodating groove 31 that is recessed to the outer side Dro in the radial direction Dr; a sealing body 20 which has a plurality of thin plates 21 laminated in the circumferential direction Dc, in which an outer peripheral end portion 20t on the outer side Dro in the radial direction Dr is accommodated in the accommodating groove 31, and in which an inner peripheral end portion 20s on an inner side Dri in the radial direction Dr extends from the housings 30A to 30F to the inner side Dri in the radial direction Dr to come into slidable contact with an outer peripheral surface 5f of the rotor 5; and a convex portion 50 which protrudes in an axial direction Da in which the central axis O extends from any one of the housings 30A to 30F and the sealing body 20 toward the other in the accommodating groove 31, in which the sealing body 20 partitions an annular space 100 between the rotor 5 and the housings 30A to 30F into a high-pressure region H on a first side Da1 in the axial direction Da and a low-pressure region L on a second side Da2 in the axial direction Da, the sealing body 20 has a sealing body low-pressure-side side surface 22g facing the second side Da2 in the axial direction Da within the accommodating groove 31, the housings 30A to 30F have a facing surface 32g which forms a part of the accommodating groove 31 and faces the sealing body low-pressure-side side surface 22g at an in the a interval axial direction Da, and communication portion 60A which allows the low-pressure region L and an inside of the accommodating groove 31 to communicate with each other, the convex portion 50 is formed on the facing surface 32g or the sealing body low-pressure-side side surface 22g, and partitions a space between the facing surface 32g and the sealing body low-pressure-side side surface 22g into a first space portion 201 on the outer side Dro in the radial direction Dr and a second space portion 202 on the inner side Dri in the radial direction Dr, and the communication portion 60A allows the first space portion 201 and the low-pressure region L to communicate with each other.

In the shaft sealing devices 10A to 10F, the convex portion 50 partitions a space between the facing surface 32g and the sealing body low-pressure-side side surface 22g into a first space portion 201 on the outer side Dro in the radial direction Dr and a second space portion 202 on the inner side Dri in the radial direction Dr. The second space portion 202 is connected to the low-pressure region L, and has a low pressure equivalent to that of the low-pressure region L. The low-pressure region L and the first space portion 201 communicate through the communication portion 60A, so that the first space portion 201 also has a low pressure equivalent to that of the low-pressure region L. Therefore, the first space portion 201 and the second space portion 202 have a pressure difference with reference to the high-pressure region H positioned with the sealing body 20 interposed therebetween in the axial direction Da. Thus, a first flow F1 of the working fluid toward the first space portion 201 and a second flow F2 of the working fluid toward the second space portion 202 are generated as a flow from the high-pressure region H toward the low-pressure region L.

The first flow F1 of the working fluid flowing from the high-pressure region H toward the first space portion 201 flows obliquely toward the outer side Dro in the radial direction Dr from the first side Da1 toward the second side Da2 in the axial direction Da, as compared with the second flow F2. The sealing body 20 is pressed by the first flow F1 so as to float slightly to the outer side Dro in the radial direction Dr with respect to the outer peripheral surface 5f of the rotor 5. As a result, it is possible to suppress the inner peripheral end portion 20s of the sealing body 20 from coming into strong contact with the outer peripheral surface 5f of the rotor 5. Therefore, wear of the sealing body 20 is suppressed.

Moreover, the second space portion 202 is formed to be connected to the low-pressure region L at a position close to the outer peripheral surface 5f of the rotor 5. Therefore, the second flow F2 of the working fluid from the high-pressure region H toward the second space portion 202 flows relatively straight from the first side Da1 to the second side Da2 in the axial direction Da so as to follow the outer peripheral surface 5f of the rotor 5, as compared with the first flow F1. The first flow F1 obliquely flowing toward the outer side Dro in the radial direction Dr and the second flow F2 flowing in a direction different to that of the first flow F1 can sufficiently secure a force that floats the sealing body 20 to the outer side Dro in the radial direction Dr. As a result, it is possible to stably suppress the inner peripheral end portion 20s of the sealing body 20 from coming into strong contact with the outer peripheral surface 5f of the rotor 5. Therefore, wear of the sealing body 20 can be suppressed more effectively.

Moreover, the convex portion 50 suppresses the movement of the sealing body 20 to the second side Da2 in the axial direction Da. Therefore, the sealing body 20 is suppressed from losing its posture in the accommodating groove 31. As a result, the sealing body 20 is tilted in the accommodating groove 31, thereby suppressing the formation of a gap which connects the high-pressure region H to the first space portion 201 through the inside of the accommodating groove 31. Therefore, it is possible to suppress the working fluid from flowing from the high-pressure region H to the first space portion 201 while going around the sealing body 20 in the accommodating groove 31. As a result, even when the number of components constituting the shaft sealing device 10A is reduced without providing a separate member such as a holding ring or a low-pressure side seal, the flow of the working fluid around the sealing body 20 can be appropriately maintained. Accordingly, it is possible to reduce the number of components and to reduce costs while suppressing wear of the sealing body 20.

(2) According to a second aspect, shaft sealing devices 10A to 10F are the shaft sealing devices 10A to 10F of (1), in which the shaft sealing devices 10A to 10F further include a side plate 40 which is disposed on the first side Da1 in the axial direction Da with respect to the sealing body 20, in which the sealing body 20 has a sealing body high-pressure-side side surface 22f facing the first side Da1 in the axial direction Da, the side plate 40 is disposed along the sealing body high-pressure-side side surface 22f in the accommodating groove 31, and the convex portion 50 is disposed on the outer side Dro in the radial direction Dr, which is closer to an end portion 40a of the side plate 40 on the inner side Dri in the radial direction Dr.

Accordingly, the first space portion 201 is largely positioned on the outer side Dro in the radial direction Dr with respect to the high-pressure region H which is an inlet. Thus, the first flow F1 of the working fluid from the high-pressure region H toward the first space portion 201 is a flow that is further toward the outer side Dro in the radial direction Dr. As a result, a force of floating the sealing body 20 to the outer peripheral surface 5f of the rotor 5 due to the first flow F1 becomes stronger. As a result, it is possible to stably suppress the inner peripheral end portion 20s of the sealing body 20 from coming into strong contact with the outer peripheral surface 5f of the rotor 5. Therefore, wear of the sealing body 20 can be suppressed more effectively.

(3) According to a third aspect, shaft sealing devices 10A to 10F are the shaft sealing devices 10A to 10F of (1) or (2), in which the convex portion 50 is formed on the facing surface 32g to protrude to the first side Da1 in the axial direction Da, and abuts against the sealing body low-pressure-side side surface 22g to restrict movement of the sealing body 20 to the second side Da2 in the axial direction Da.

Accordingly, the sealing body low-pressure-side side surface 22g abuts against the convex portion 50 formed on the facing surface 32g to restrict the movement of the sealing body 20 to the second side Da2 in the axial direction Da. Therefore, it is possible to suppress a posture of the sealing body 20 from collapsing in the accommodating groove 31. In addition by forming the convex portion 50 on the housing 30A, it is possible to reduce the complexity of the shape of the plurality of thin plates 21 constituting the sealing body 20. Accordingly, the sealing body 20 can be manufactured at low costs.

(4) According to a fourth aspect, shaft sealing devices 10A and 10B are the shaft sealing devices 10A and 10B according to any one of (1) to (3), in which the communication portions 60A and 60B have communication holes 61 and 62 formed such that one end thereof is open at the facing surface 32g and the other end is open at an outer surface of the housings 30A and 30B that face the low-pressure region L.

Accordingly, the first space portion 201 communicates with the low-pressure region L through the communication hole 61. Therefore, the pressure inside the first space portion 201 can be made equivalent to that of the low-pressure region L with a simple structure.

(5) According to a fifth aspect, a shaft sealing device 10B is the shaft sealing device 10B of (4), in which a plurality of communication holes 62 are formed while being spaced apart from each other in the circumferential direction.

As described above, the first space portion 201 is connected to the low-pressure region L through the plurality of communication holes 62, so that it is possible to suppress variation in pressure inside the first space portion 201 as compared with a case in which the first space portion 201 is connected to the low-pressure region L through one communication hole 61. Thus, the pressure inside the first space portion 201 can be reduced to a low pressure under a uniform pressure state.

(6) According to a sixth aspect, a shaft sealing device 10C is the shaft sealing device 10C according to any one of (1) to (4), in which the communication portion 60C has a communication groove 63 formed to pass therethrough the convex portion 50 in the radial direction Dr and allow the first space portion 201 and the second space portion 202 to communicate with each other.

Accordingly, the pressure inside the first space portion 201 can be made equivalent to that of the low-pressure region L. Furthermore, the communication groove 63 is formed as a groove recessed from the convex portion 50, so that processing becomes easier than forming a through-hole that passes through the housing 30A. Therefore, the communication portion 60C can be formed more simply.

(7) According to a seventh aspect, a shaft sealing device 10C is the shaft sealing device 10C of (6), in which a plurality of communication grooves 63 are formed while being spaced apart from each other in the circumferential direction Dc.

As described above, the second space portion 202 is connected to the low-pressure region L through the plurality of communication grooves 63, so that it is possible to suppress variation in pressure inside the first space portion 201 as compared with a case in which the second space portion 202 is connected to the low-pressure region L through one communication groove 63. Thus, the pressure inside the first space portion 201 can be reduced to a low pressure under a uniform pressure state.

(8) According to an eighth aspect, shaft sealing devices 10D and 10E are the shaft sealing devices 10D and 10E according to any one of (1) to (7), in which the shaft sealing devices 10D and 10E further include: outer peripheral convex portions 70 and 71 which are disposed on the outer side Dro in the radial direction Dr with respect to the convex portion 50 and protrude from any one of the facing surface 32g and the sealing body low-pressure-side side surface 22g to the other in the axial direction Da.

Accordingly, the posture of the sealing body 20 is maintained in the accommodating groove 31 not only by the convex portion 50 but also by the outer peripheral convex portions 70 and 71 disposed on the outer side Dro in the radial direction Dr with respect to the convex portion 50. Since the posture is maintained at two positions, the convex portion 50 and the outer peripheral convex portions 70 and 71 separated from each other in the radial direction Dr, the posture of the sealing body 20 can be maintained in a more stable posture in the accommodating groove 31.

(9) According to a ninth aspect, shaft sealing devices 10A to 10F are the shaft sealing devices 10A to 10F according to any one of (1) to (8), in which the sealing body 20 has a main body portion 22, and a head portion 23 protrudes from the main body portion 22 to both sides in the axial direction Da on the outer side in the radial direction Dr than the sealing body low-pressure-side side surface 22g, the accommodating groove 31 has a main body accommodating portion 32 in which the main body portion 22 is accommodated, and a head accommodating portion 33 which is formed on the outer side Dro in the radial direction Dr with respect to the main body accommodating portion 32 to accommodate the head portion 23 therein, and the head accommodating portion 33 has an outer peripheral contact surface 33h that faces the outer side Dro in the radial direction Dr and allows the head portion 23 to come into contact from the outer side Dro in the radial direction Dr.

Accordingly, the head portion 23 of the sealing body 20 comes into contact with the outer peripheral contact surface 33h from the outer side Dro in the radial direction Dr of the head accommodating portion 33. The posture of the sealing body 20 in the accommodating groove 31 is maintained not only by the convex portion 50 but also by the head portion 23. Therefore, the sealing body 20 is tilted in the accommodating groove 31, thereby suppressing the formation of a gap which connects the high-pressure region H to the first space portion 201 through the inside of the accommodating groove 31. Furthermore, the head portion 23 comes into contact with the outer peripheral contact surface 33h of the head accommodating portion 33, so that it is possible to suppress the flow of the high-pressure working fluid from the high-pressure region H into the first space portion 201 that has passed through the head accommodating portion 33. Accordingly, it is possible to stably suppress the working fluid from flowing from the high-pressure region H to the first space portion 201 while going around the sealing body 20 from the head accommodating portion 33 in the accommodating groove 31.

(10) According to a tenth aspect, a shaft sealing device 10F is the shaft sealing device 10F according to any one of (1) to (9), in which the shaft sealing device 10F further includes an biasing member 80 which is disposed inside the accommodating groove 31 to bias the sealing body 20 to the inner side Dri in the radial direction Dr with respect to the housing 30F.

Accordingly, the sealing body 20 is in a state of being pushed toward the inner side Dri in the radial direction Dr while facing the outer peripheral surface 5f of the rotor 5. As a result, it is possible to suppress excessive movement of the sealing body 20 to the outer side Dro in the radial direction Dr due to the first flow F1 of the working fluid flowing from the high-pressure region H toward the first space portion 201. Therefore, it is possible to stably maintain a state in which the inner peripheral end portion 20s of the sealing body 20 appropriately comes into slidable contact with the outer peripheral surface 5f of the rotor 5 and exhibits good sealing performance.

(11) According to an eleventh aspect, a shaft sealing device 10D is the shaft sealing device 10D according to any one of (1) to (10), in which at least one of the housing 30D and the sealing body 20 is formed of a plurality of divided bodies 11 in the circumferential direction Dc, and the shaft sealing device 10D further includes a seam convex portion 90 which is formed on at least one of the facing surface 32g and the sealing body low-pressure-side side surface 22g in a region overlapping with a seam of adjacent divided bodies 11 in the circumferential direction Dc when viewed from the axial direction Da, protrudes from any one of the facing surface 32g and the sealing body low-pressure-side side surface 22g toward the other in the axial direction Da, and extends in the radial direction Dr along the seam.

Accordingly, in each of the divided bodies 11 adjacent to each other in the circumferential direction Dc, the first space portion 201 is in a state of not being connected to (a state of not communicating with) a part of the seam J of the divided bodies 11. Thus, it is possible to suppress the working fluid in the first space portion 201 from leaking from the seam J to the outside of the housing 30D. As a result, it is possible to suppress the pressure state in the first space portion 201 from being changed by the seam J of the divided body 11.

(12) According to a twelfth aspect, a rotary machine 1 includes the shaft sealing devices 10A to 10F according to any one of (1) to (11).

Examples of the rotary machine include a large-scale fluid machine such as a gas turbine, a steam turbine, a compressor, a water wheel, a chiller, and a pump.

Accordingly, by providing the shaft sealing devices 10A to 10F as described above, it is possible to provide the rotary machine 1 capable of reducing costs while suppressing wear of the sealing body 20.

INDUSTRIAL APPLICABILITY

According to the shaft sealing device and the rotary machine of the present disclosure, it is possible to reduce costs while suppressing wear of the sealing body.

REFERENCE SIGNS LIST

1: Rotary machine
2: Compressor
3: Combustor
4: Turbine
5: Rotor
5f: Outer peripheral surface
6a, 6b: Stator vane
7a, 7b: Rotating blade
8, 9: Casing
10A, 10B, 10C, 10D, 10E, 10F: Shaft sealing device
11, 11A, 11B: Divided body
20: Sealing body
20s: Inner peripheral end portion
20t: Outer peripheral end portion
21: Thin plate
22: Main body portion
22f: Sealing body high-pressure-side side surface
22g: Sealing body low-pressure-side side surface
23: Head portion
24A: First concave portion
24B: Second concave portion
30A, 30B, 30C, 30D, 30E, 30F: Housing
30f: Inner peripheral surface
30h: Insertion hole
31: Accommodating groove
32: Main body accommodating portion
32a: End portion (on high-pressure-side facing surface)
32f: High-pressure-side facing surface
32g: Low-pressure-side facing surface (facing surface)
32s: End portion (on low-pressure-side facing surface)
33: Head accommodating portion
33h: Outer peripheral contact surface
38: Shim
40: Side plate
40a: End portion (on side plate)
41: Engaging convex portion
50: Convex portion
60A, 60B, 60C: Communication portion
61, 62: Communication hole
63: Communication groove
70: Outer peripheral convex portion
70a: First surface
70b: Second surface
71: Outer peripheral convex portion
80: Biasing member
81: Biasing member body
82: Fixing member
90, 90A, 90B: Seam convex portion
95: R portion
100: Annular space
201: First space portion
202: Second space portion
Da: Axial direction
Da1: First side
Da2: Second side
Dc: Circumferential direction
Dr: Radial direction
Dri: Inner side
Dro: Outer side
H: High-pressure region
L: Low-pressure region
J: Seam
O: Central axis
S1: Dimension
S2: Dimension
S3: Dimension
S4: Dimension
W1: Width dimension
W2: Width dimension

The invention claimed is:

1. A shaft sealing device comprising:
a housing which is disposed on an outer side in a radial direction at an interval with respect to a rotor being rotatable around a central axis, extends in a circumferential direction around the central axis, and has an accommodating groove that is recessed to the outer side in the radial direction;
a sealing body which has a plurality of thin plates laminated in the circumferential direction, in which an outer peripheral end portion on the outer side in the radial direction is accommodated in the accommodating groove, and in which an inner peripheral end portion on an inner side in the radial direction extends from the housing to the inner side in the radial direction to come into slidable contact with an outer peripheral surface of the rotor; and
a convex portion which protrudes in an axial direction in which the central axis extends from any one of the housing and the sealing body toward the other in the accommodating groove,
wherein the sealing body partitions an annular space between the rotor and the housing into a high-pressure region on a first side in the axial direction and a low-pressure region on a second side in the axial direction,
the sealing body has a sealing body low-pressure-side side surface facing the second side in the axial direction within the accommodating groove,
the housing has
a facing surface which forms a part of the accommodating groove and faces the sealing body low-pressure-side side surface at an interval in the axial direction, and
a communication portion which allows the low-pressure region and an inside of the accommodating groove to communicate with each other,
the convex portion is formed on the facing surface or the sealing body low-pressure-side side surface, and partitions a space between the facing surface and the sealing body low-pressure-side side surface into a first space portion on the outer side in the radial direction and a second space portion on the inner side in the radial direction, and
the communication portion allows the first space portion and the low-pressure region to communicate with each other.

2. The shaft sealing device according to claim 1, further comprising:
a side plate which is disposed on the first side in the axial direction with respect to the sealing body,
wherein the sealing body has a sealing body high-pressure side surface facing the first side in the axial direction,
the side plate is disposed along the sealing body high-pressure side surface in the accommodating groove, and
the convex portion is disposed on the outer side in the radial direction, which is closer to an end portion of the side plate on the inner side in the radial direction.

3. The shaft sealing device according to claim 1,
wherein the convex portion is formed on the facing surface to protrude to the first side in the axial direction, and abuts against the sealing body low-pressure-side side surface to restrict movement of the sealing body to the second side in the axial direction.

4. The shaft sealing device according to claim 1, wherein the communication portion has at least one communication hole formed such that one end thereof is open at the facing surface and the other end is open at an outer surface of the housing that faces the low-pressure region.

5. The shaft sealing device according to claim 4, wherein a plurality of communication holes are formed while being spaced apart from each other in the circumferential direction.

6. The shaft sealing device according to claim 1, wherein the communication portion has at least one communication groove formed to pass therethrough the convex portion in the radial direction and allow the first space portion and the second space portion to communicate with each other.

7. The shaft sealing device according to claim 6, wherein a plurality of communication grooves are formed while being spaced apart from each other in the circumferential direction.

8. The shaft sealing device according to claim 1, further comprising:
an outer peripheral convex portion which is disposed on the outer side in the radial direction with respect to the convex portion and protrudes from any one of the facing surface and the sealing body low-pressure-side side surface to the other in the axial direction.

9. The shaft sealing device according to claim 1, wherein the sealing body has a main body portion, and a head portion which protrudes from the main body portion to both sides in the axial direction on the outer side in the radial direction than the sealing body low-pressure-side side surface, the accommodating groove has a main body accommodating portion in which the main body portion is accommodated, and a head accommodating portion which is formed on the outer side in the radial direction with respect to the main body accommodating portion to accommodate the head portion therein, and the head accommodating portion has an outer peripheral contact surface that faces the outer side in the radial direction and allows the head portion to come into contact from the outer side in the radial direction.

10. The shaft sealing device according to claim 1, further comprising:
a biasing member which is disposed inside the accommodating groove to bias the sealing body in the radial direction with respect to the housing.

11. The shaft sealing device according to claim 1, wherein at least one of the housing and the sealing body is formed of a plurality of divided bodies in the circumferential direction, and the shaft sealing device further includes a seam convex portion which is formed on at least one of the facing surface and the sealing body low-pressure-side side surface in a region overlapping with a seam of adjacent divided bodies in the circumferential direction when viewed from the axial direction, protrudes from any one of the facing surface and the sealing body low-pressure-side side surface toward the other in the axial direction, and extends in the radial direction along the seam.

12. A rotary machine comprising the shaft sealing device according to claim 1.

* * * * *